US010057205B2

(12) United States Patent
Spicer et al.

(10) Patent No.: US 10,057,205 B2
(45) Date of Patent: Aug. 21, 2018

(54) SYSTEMS AND METHODS FOR CREATING AND ACCESSING COLLABORATIVE ELECTRONIC MULTIMEDIA COMPOSITIONS

(71) Applicant: GroupLuv, Inc., Denver, CO (US)

(72) Inventors: Justin Spicer, Denver, CO (US); Chris Cuilla, Bloomfield, CO (US)

(73) Assignee: GROUPLUV, INC., Denver, CO (US)

( * ) Notice: Subject to any disclaimer, the term of this patent is extended or adjusted under 35 U.S.C. 154(b) by 244 days.

(21) Appl. No.: 14/864,691

(22) Filed: Sep. 24, 2015

(65) Prior Publication Data
US 2016/0149843 A1 May 26, 2016

Related U.S. Application Data

(60) Provisional application No. 62/082,251, filed on Nov. 20, 2014.

(51) Int. Cl.
G06F 15/16 (2006.01)
H04L 12/58 (2006.01)
G06Q 10/10 (2012.01)

(52) U.S. Cl.
CPC ........... H04L 51/32 (2013.01); G06Q 10/101 (2013.01)

(58) Field of Classification Search
CPC .............................. G06Q 10/101; H04L 51/32
See application file for complete search history.

(56) References Cited

U.S. PATENT DOCUMENTS

| | | | |
|---|---|---|---|
| 6,507,865 B1 | 1/2003 | Hanson et al. |
| 7,035,803 B1 | 4/2006 | Ostermann et al. |
| 7,143,357 B1 | 11/2006 | Snibbe et al. |
| 7,302,274 B2 | 11/2007 | Makela et al. |
| 7,596,598 B2 | 9/2009 | Birch |
| 8,359,206 B2 | 1/2013 | Whalin et al. |
| 2002/0097259 A1 | 7/2002 | Marshall et al. |
| 2007/0238082 A1 | 10/2007 | Ingrassia |
| 2009/0063178 A1 | 3/2009 | Prousti et al. |
| 2009/0125410 A1 | 5/2009 | Perlman |
| 2009/0150797 A1 | 6/2009 | Burkholder et al. |
| 2009/0161839 A1 | 6/2009 | Neumann |

(Continued)

FOREIGN PATENT DOCUMENTS

| | | |
|---|---|---|
| WO | WO 2006022950 A3 | 7/2007 |
| WO | WO 2008071992 A2 | 12/2007 |
| WO | WO 2011086465 A1 | 7/2011 |

OTHER PUBLICATIONS

Doozy Cards LLC Website; One line greeting cards; http://www.doozycards.com/ecards/ecard-games; last accessed Feb. 8, 2016.

(Continued)

Primary Examiner — Normin Abedin
(74) Attorney, Agent, or Firm — Sheppard Mullin Richter & Hampton LLP

(57) ABSTRACT

Systems and methods for production of a collaborative electronic multimedia composition allow an initiator to select a collaboration template and multiple collaborating users. The collaborating users receive invitations to contribute to the collaborative electronic multimedia composition by customizing one or more fields of the collaboration template with multimedia content, including for example photographs and captions.

20 Claims, 19 Drawing Sheets

(56) References Cited

U.S. PATENT DOCUMENTS

| | | |
|---|---|---|
| 2009/0252435 A1 | 10/2009 | Wen et al. |
| 2009/0260060 A1 | 10/2009 | Smith et al. |
| 2010/0223155 A1 | 9/2010 | Anderson et al. |
| 2011/0016409 A1 | 1/2011 | Grosz et al. |
| 2011/0202624 A1 | 8/2011 | Njam |
| 2011/0289149 A1 | 11/2011 | Shmueli et al. |
| 2012/0011450 A1* | 1/2012 | To .................... G06Q 10/10 715/752 |
| 2012/0265758 A1* | 10/2012 | Han .................. G06F 17/30038 707/737 |
| 2012/0276880 A1 | 11/2012 | Angorn et al. |
| 2013/0132228 A1 | 5/2013 | Chang |
| 2013/0159445 A1 | 6/2013 | Zonka et al. |
| 2013/0268377 A1 | 10/2013 | Jessup et al. |
| 2014/0013278 A1 | 1/2014 | Wu et al. |

OTHER PUBLICATIONS

PBS Kids Website; Arthur Games; http://pbskids.org/arthur/games/index.html#1; last accessed Feb. 8, 2016.

Starwars Games Website; http://www.starwars.com/games-apps; Lucasfilm Ltd.; last accessed Feb. 8, 2016.

123Greetings.com, Inc. Website; http://www.123greetings.com/birthday/birthday_fun/funny232.html.; last accessed Feb. 8, 2016.

Carlsen Cards Website; http://www.carlsencards.com/; 2006-2015 Relax, Inc.; last accessed Feb. 8, 2016.

Battleon Game Website; www.battleon.com/survey/ecard.asp; last accessed Feb. 8, 2016.

Got Free Cards Website; http://www.got-free-ecards.com/photo-cards/; 2008-2016 gotfreecards.com; last accessed Feb. 8, 2016.

Photo Frame E Cards Website; http://www.frameshow.com/ecard_application/photo_frame_ecards. php; last accessed Feb. 8, 2016.

Group Card Website; http://www.groupcard.com/; 2016; last accessed Feb. 8, 2016.

Flickr Greeting Card Clearinghouse Website; https://www.flickr.com/groups/greetingcards/discuss/72157602243036119/; last accessed Feb. 8, 2016.

Flashpotatoes.com Website; http://www.flashpotatoes.com/E-card-_Design.html; Ecard Design; last accessed Feb. 8, 2016.

Someecards.com Website; http://www.someecards.com/; last accessed Feb. 8, 2016.

* cited by examiner

10,057,205 B2

SYSTEMS AND METHODS FOR CREATING AND ACCESSING COLLABORATIVE ELECTRONIC MULTIMEDIA COMPOSITIONS

TECHNICAL FIELD

The disclosed technology generally relates to collaborative multimedia compositions, and more particularly, to a system and method for creating and accessing collaborative electronic multimedia compositions, such as, for example, greeting cards, photo albums, video albums, event cards or albums, screen savers, and desktop themes.

BACKGROUND

Electronic multimedia compositions, such as greeting cards and photo albums by way of example, have become an efficient and effective way for people to communicate and socialize with friends, family and the online community. Creating electronic multimedia composition offers a greater range of customization, personalization and sharing features that are often unavailable with non-electronic medium, such as handwritten greeting cards or printed photographs. For example, when creating electronic greeting cards and picture albums, a user may add a plurality of musical sounds, image effects, and various animations to create a more personalized and interactive experience for the recipient of the electronic multimedia composition.

In conventional platforms generated to create, collaborate and display electronic multimedia compositions through a website service, there is currently no way for users to save the created electronic multimedia composition, such as online greeting cards, photo albums and event cards, and to access them without having to constantly go through the website service to view and interact with the electronic multimedia composition. This severely limits viewing options to the electronic multimedia composition, especially since the user must always log on to a network and web browser. Another issue with conventional electronic multimedia compositions is that there is no streamlined platform to create electronic multimedia compositions dedicated to a particular live public event, where the attendees of the event collaborate to create the electronic multimedia composition. The problem is highlighted when collaborated electronic multimedia composition created through a website service is often only viewed once and forgotten, making the electronic multimedia composition a one-time viewing experience.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF SUMMARY OF THE INVENTION

In light of the above-described shortcomings of conventional multimedia compositions, there is a need for electronic multimedia compositions, such as greeting cards and photo albums, to be saved as local files or viewed through a plurality of other accessible applications, such as social media and networking sites. The personalized experience with creating and receiving electronic multimedia composition is often short lived because most are only accessible through a particular webpage, severely limiting viewing and accessibility options. As a result, allowing the electronic multimedia composition created from a website service to be saved and viewed as a local file on a computing device significantly provides a greater range of viewing options for the electronic multimedia composition, such as displaying it as a desktop or screensaver on the computing device.

Furthermore, there is a need for providing a streamlined process for creating and sharing collaborative electronic multimedia composition, such as messages and photo albums at a large public venue or event. As a result, current disclosed subject matter provides a streamlined and efficient way for users to come together to create and share various electronic multimedia composition.

Embodiments of the technology disclosed herein are directed towards computer-implemented systems and methods for generating a collaborative platform for a plurality of users to come together in a virtual setting and create an electronic multimedia composition. More particularly, the various embodiments of the technology disclosed herein relate to a system and method for generating a collaborative interface for creating, collaborating and sharing electronic multimedia compositions such as collaborative greeting cards or group albums through a webpage. The detailed descriptions set forth below in connection with the drawings are intended as examples and descriptions of various embodiments of the present disclosure and not intended to represent the only embodiments in which the technology of the present disclosure may be practiced.

For example, the computer implemented systems and methods include a server, processor, and a memory module configured to grant an initiator access to a specified webpage that contains the necessary software tools and features to create a collaborative multimedia composition. An initiator may generally be defined as a user who takes the initiative and begins creating the basis of electronic multimedia composition. In order to begin creating a collaborative platform to create and display multimedia content, a template is selected. A template is a pre-determined page layout of the electronic multimedia composition with specified fields indicating where messages and photographs can be uploaded. Furthermore, a template serves as a collaborative platform by allowing a plurality of invited users, or otherwise known as contributors, to come together in a specified virtual setting through a web browser to add and upload messages and other various multimedia content onto the template, where the completed template is then converted into an electronic multimedia composition and ready to be sent to a selected recipient to be enjoyed as a hands-free multimedia presentation or as an interactive multimedia presentation or game.

In certain embodiments, the template can be utilized to create an electronic greeting card. In other embodiments, the template can be utilized to create a group album to be created and displayed at a particular public live event using on-site screens, sub-screens, monitors, television monitors and projectors. Optionally, to access the selected template on a network, a unique web address is automatically generated and assigned to each template selected by the initiator. By way of example, a unique web address is a uniform resource locator ("URL"), where the URL stores and saves the location, including any implemented updates, of the template onto the network. In one embodiment, the generated URL address may remain constant throughout the entire process of creating, collaborating and displaying multimedia content, allowing the initiator and invited contributors to participate and locate the template with relative ease and efficiency. When the contents of the template are completely filled and ready to be sent to a selected recipient, the template is converted into a completed electronic multimedia composition. When the template is converted, the editing features of the template are disabled and the messages, multimedia content and/or animations displayed.

In certain embodiments, the completed electronic multimedia composition is converted into a local file to be saved onto a computing device. In one embodiment, electronic multimedia composition is saved as a local file and displayed as a wallpaper, screensaver or slideshow on the computing device. In certain embodiments, the completed electronic multimedia composition can be shared onto social media accounts such as, but not limited to Facebook, Instagram, Flickr, Google Plus, LinkedIn, Tumblr, Snapchat, MySpace and the like.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF VARIOUS EMBODIMENTS

Embodiments of the technology disclosed herein are directed towards creating a collaborative platform for a plurality of users to come together in a virtual setting to create electronic multimedia compositions via collaboration. More particularly, the various embodiments of the technology disclosed herein relate to a computer-implemented system and method for generating a collaborative interface for creating, collaborating and sharing greeting cards and photo and video albums through a webpage or software application. Various embodiments described and illustrated in the detailed descriptions drawings set forth below are exemplary only and are not intended to limit the scope of the present disclosure in any way.

Figure 1:
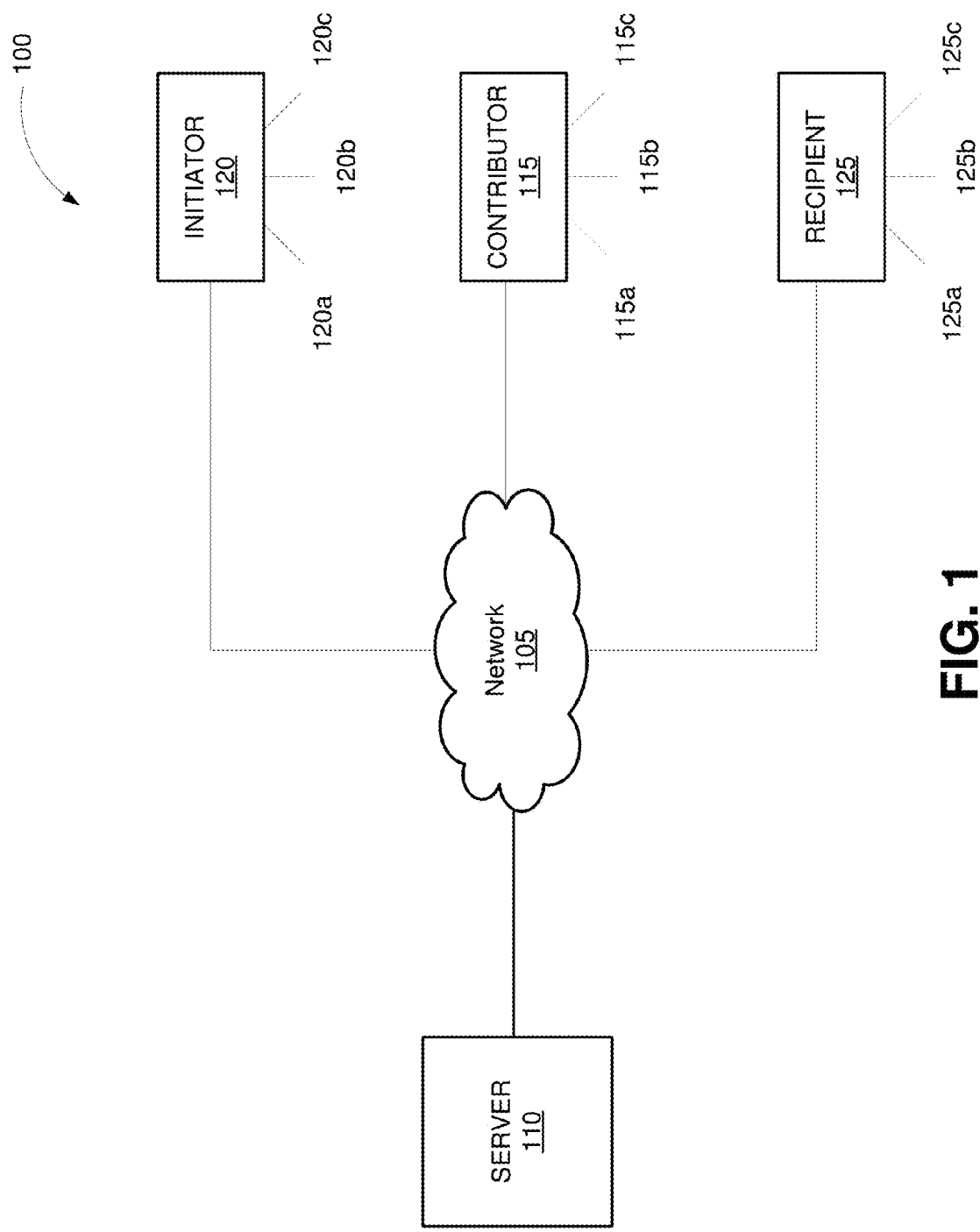
FIG. 1 is a block diagram depicting an exemplary collaborative multimedia composition system for generating, collaborating, and sharing electronic multimedia content according to certain aspects of the present disclosure.

As the present disclosure is directed generally to creating collaborative multimedia compositions including collaborative media content, the following description provides relevant context for the embodiments described therein. Collaborative multimedia content can include one or more messages including text, picture, video and/or animation. Collaborative multimedia composition may take the form of, but is not limited to, a greeting card and a group album. FIG. 1 is a block diagram depicting an exemplary collaborative multimedia composition system 100 for generating, collaborating and sharing electronic multimedia content according to certain aspects of the present disclosure. An initiator 120, or a plurality of initiators 120a-c, logs onto a network 105 and may be required to create a login account to access a server 110 including services and tools to create electronic collaborative multimedia composition. Upon access to the server 110, the initiator 120 can begin creating electronic multimedia composition to be sent to a selected recipient 125 or a plurality of recipients 125a-c. The initiator 120 can also invite a contributor 115, or plurality of contributors 115a-c, to participate in adding a message and uploading multimedia content to create a completed electronic multimedia composition to be sent to a selected recipient 125 or the plurality of recipients 125a-c.

The system 100 includes at least one server 110, which may include various computing devices such as a mainframe, workstation, personal computer (PC), laptop, smartphone, tablet, smart televisions or the like. The server 100 includes a processing device and can be configured to implement an authorization and clearing process, with such configuration and/or associated instructions being stored in a computer storage (not shown) associated with the server 100. The computer storage can be part of the server 100 or a memory located external to the server 100. In the illustrated embodiment of FIG. 1, the server 110 is coupled to a database 130. In certain embodiments, the database 130 can store a plurality of preloaded templates, preloaded backgrounds, multimedia contents and messages received from the initiator(s) 120, 120a-c, contributor(s) 115, 115a-c, and/or webpages that are being created or have been completed.

Figure 2:
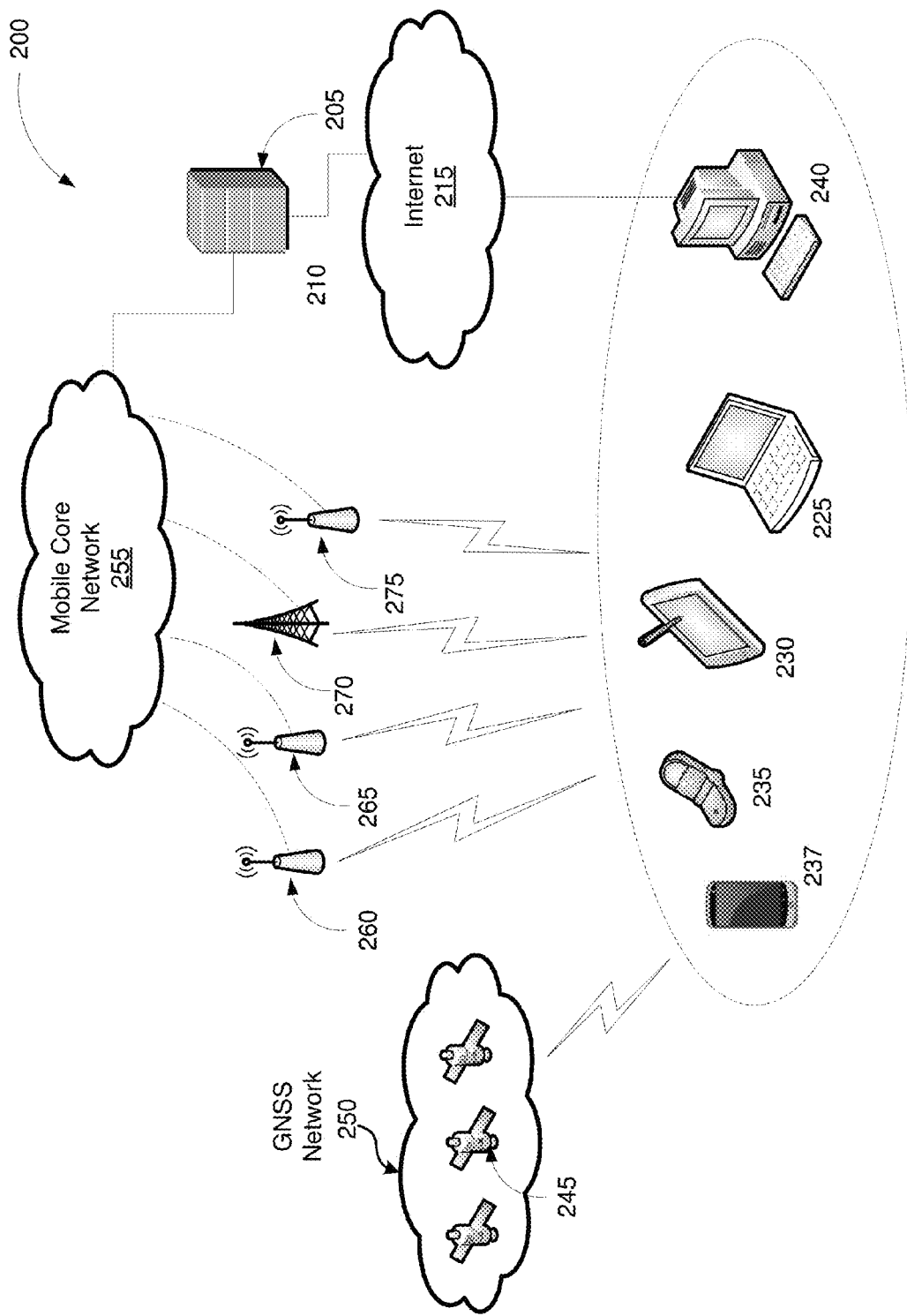
FIG. 2 is a diagram depicting an exemplary collaborative multimedia composition system, in which various embodiments of the present disclosure can be implemented.

FIG. 2 is a diagram depicting an exemplary collaborative multimedia composition system 200, in which various embodiments of the present disclosure can be implemented. The system 200 includes a plurality of computing devices 225, 230, 235, 237, 240 associated with various users of the system 200 including one or more initiators, one or more collaborators and/or one or more recipients. The system 200 also includes a server 205 that hosts one or more webpages associated with collaborative multimedia compositions such as collaborative greeting cards and group albums. The server 205 is coupled to a database (not shown) that can store a plurality of preloaded templates, preloaded backgrounds, multimedia contents and messages and/or webpages that are being created or have been completed. The computing devices 225, 230, 235, 237, 240 can include mobile computing devices 235-237 and a stationary computing device 240 (e.g., a desktop personal computer).

The mobile computing devices can include a smartphone 237, a cellular phone 235, a tablet PC 230 and/or a laptop 225. The computing devices 225, 230, 235, 237, 240 can include a software application for generating collaborative multimedia content and/or sending and receiving content associated with the collaborative multimedia composition to and from the server 205. The computing devices 225, 230, 235, 237, 240 can also include a camera for capturing a still or video image, a communication interface (e.g., a modem) for sending and receiving the content and a visual and/or audio interface (e.g., a display and speaker) for displaying and/or playing the collaborative multimedia composition. One or more of the computing devices 225, 230, 235, 237, 240 can be used by one or more initiators to initiate and monitor the creation process of the collaborative multimedia composition. One or more of the computing devices 225, 230, 235, 237, 240 can be used by one or more contributors to contribute to and monitor the creation process and/or download completed collaborative multimedia compositions. One or more of the computing devices 225, 230, 235, 237, 240 can be used by one or more recipients to display, play and/or download completed collaborative multimedia composition.

The exemplary collaborative multimedia composition system 200 of FIG. 2 also includes a mobile core network 255, a wireless access point (AP or WAP) 260, a cellular base station (BS) 270, a Bluetooth® emitter 275, a Near Field Communication (NFC) terminal 265, a global navigation satellite system (GNSS) network 250, and a plurality of GNSS satellites 245 and the Internet 215. One or more of mobile core network 255, WAP 260, cellular BS 270, Bluetooth® emitter 275, NFC terminal 265, GNSS network 250, GNSS satellites 245, internet 215, and/or location server 205, may be used in assisting to determine the location of one or more of the computing devices 220-240 for use in the application and/or to provide communications links to computing devices 220-240. The location information can be used to establish a geo-fence perimeter so that only multimedia contents submitted from contributor(s) within a predetermined location are accepted and added to the collaborative multimedia composition.

Internet 215 may include a system of interconnected networks and/or devices that enable exchange of information and/or data among a plurality of nodes, based on one or more networking standards, including, for example, Internet Protocol (IP). Internet 215 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces. The computing devices 225, 230, 235, 237, 240 may communicate as described herein in order to create, collaborate and display multimedia content over an established network and the Internet 215.

Figure 3:
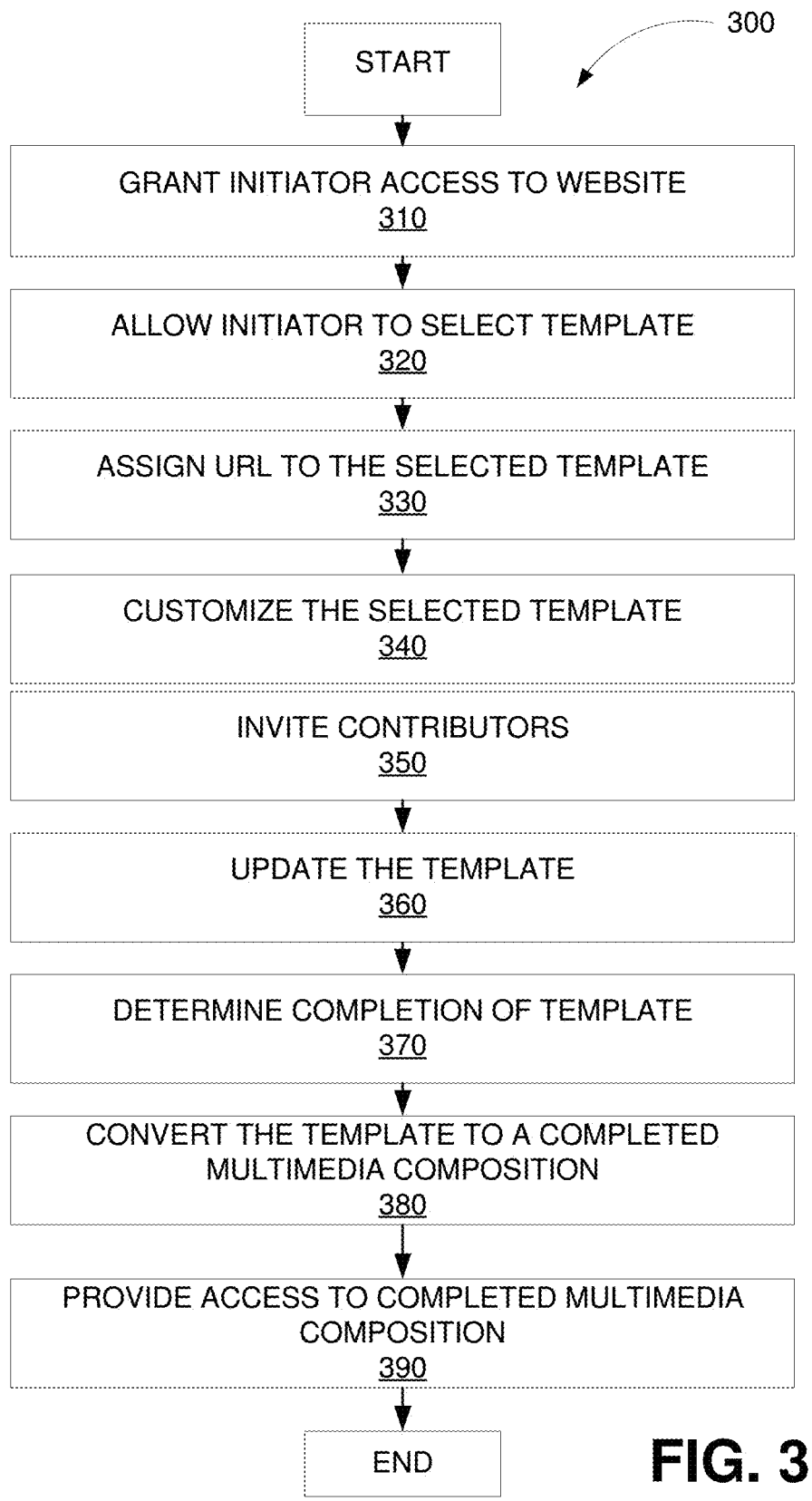
FIG. 3 is a flowchart illustrating an exemplary process for implementing certain embodiments of the collaborative multimedia composition system according to certain aspects of the present disclosure.

FIG. 3 is a flowchart illustrating an exemplary process 300 for implementing certain embodiments of the collaborative multimedia composition system according to certain aspects of the present disclosure. The process 300 can be carried out by one or more of the components/elements of the systems 100 and 200 described above with respect to FIGS. 1 and 2. The exemplary process 300 facilitates creating a platform so that users may come together in virtual space to create, collaborate and display collaborative multimedia content during the creation process and sending a completed electronic multimedia composition, including the collaborative multimedia content, to one or more selected recipients.

Referring to FIG. 3, the exemplary process 300 begins at operation 310, where an initiator's request to obtain access to a specified website is granted and the website is hosted by a server (e.g., the server 110, 205) that includes the necessary tools and services for creating, collaborating and displaying collaborative multimedia compositions. In some embodiments, the necessary tools and services for creating, collaborating and displaying collaborative multimedia compositions may be provided through a native application or a desktop application. In some embodiments, a request to obtain access to the specified website is granted only when the initiator creates a login account. The login account may require submitting specific enrollment information requested. For example, the enrollment information includes the initiator's name, address, email, postal code and account user name. In some embodiments, the server may not request a user login account and immediately grant the initiator access upon navigating to the webpage.

Once the initiator is granted access to the specified website, the exemplary process 300 proceeds to operation 320, where a basic framework for the collaborative multimedia composition is created. The operation 320 can include providing the initiator a choice of preloaded templates and allowing the initiator to select a template. A template is a pre-determined page layout where particular areas or fields are indicated to show where the initiator and contributors may add messages and upload multimedia content. In some embodiments, the template includes a preview view, which continually and seamlessly incorporates and displays the changes made onto the template. For example, when the initiator adds a picture or an animation effect to the template, the picture or animation effect may be immediately caused to be displayed onto the template, allowing the initiator to immediately monitor the visual effects as they are implemented. In some embodiments, templates may include animations, interactive elements, game elements, and games.

The exemplary process 300 proceeds to operation 330, where a unique web address is assigned to the template selected by the initiator at the end of operation 320. By way of example, a unique web address is a uniform resource locator ("URL") that corresponds to the location of the selected template on the network. Furthermore, any changes and updates implemented to the template may be saved and accessible through the URL assigned to the selected template. In some embodiments, the assigned URL address may remain constant throughout the entire process of creating a collaborative multimedia composition and sending the composition to one or more selected recipients.

After a template is selected and a unique web address is assigned, the exemplary process 300 proceeds to operation 340, where the selected template may be customized by the initiator. Some embodiments may skip this or other steps. The customization operation 340 can include selecting a background from a list of preloaded backgrounds. The customization operation 340 can also include selecting a message or messages (e.g., text, picture, animation, and/or video) from a list of preloaded messages associated with the selected template or background. The customization operation 340 can also include uploading a message or messages (e.g., text, picture, animation, and/or video) from the initiator's computing device or from a photo sharing site or from a social media site designated by the initiator.

After the customization operation 340, the exemplary process 300 proceeds to operation 350, where one or more contributors are invited to participate in the process of creating the collaborative multimedia composition. In some embodiments, the website hosting the template prompts the initiator to input a list of contributors to invite. In certain embodiments, the system automatically generates a list of suggested contributors. For example, the initiator can identify a list of family members and/or a list of friends including their names and email addresses during the initial enrollment process associated with the operation 310. When the initiator identifies a particular person (e.g., the initiator's mother) in the list of family members, the server automatically generates a list of suggested contributors that includes other family members in the list. The initiator can add or delete persons the list of suggested contributors.

In some embodiments, the URL associated with the selected template is included in the invitation so that invited contributor(s) can readily locate the selected template on the network. Contributors can be required to create a login account before accessing the template through the URL. Creating a login account can require the contributor to give necessary enrollment information, which can include for example, the contributor's name, address, email, postal code, account user name, and/or relationship to the initiator. In some embodiments, a user login account may not request a user login account and immediately grant the initiator access upon navigating to the webpage. In some embodiments, invited contributors, the initiator, and/or the recipient (or any subset thereof) may have access to the collaboration/composition, either when finished or while in progress.

The exemplary process 300 proceeds to operation 360, where the template is updated with multimedia contents added, deleted and/or modified by the initiator and/or the invited contributors. In some embodiments, the changes (e.g., additions, deletions and/or modifications) are made on a webpage corresponding to the selected template displayed on the computing device of the initiator or contributor. In certain embodiments, when the template is updated with a change (e.g., addition, deletion and/or change), the webpage corresponding to the template is automatically updated on the display of the computing device of the initiator or contributors.

The exemplary process 300 proceeds to operation 370, where it is determined that the template is completed and ready to be converted to an electronic multimedia composition, such as a greeting card or group album. Various methods of determining the completion of the selected template can be utilized. For example, the initiator can place a pre-determined time limit, where the selected template must be completed within a pre-determined number of hours, days or weeks. Upon expiration of the time limit, the contents of the template are locked, preventing any further changes (e.g., additions, deletions and/or modifications) to the completed template. In some embodiments, the system automatically determines completion when all invited contributors indicate that they completed their contributions. In some embodiments, the initiator subjectively determines that the template is completed and ready to be sent to a selected recipient as a completed electronic multimedia composition. As a result of the completion determination, the contents of the template can be locked, preventing any further change to the completed template.

When the selected template is determined to be completed, the exemplary process 300 proceeds to operation 380, where the completed template may be converted to a completed electronic multimedia composition, such as a greeting card or a group album, for example. Some embodiments may skip this or other steps. Various electronic multimedia compositions including collaborative greeting cards and group albums will be described below.

The exemplary process 300 proceeds to operation 390, where access to the completed electronic multimedia composition is provided to one or more selected recipients. In some embodiments, the access is provided by sending an e-mail that includes the URL address associated with the electronic multimedia composition to the recipient(s). In certain embodiments, the access is provided by sending an e-mail that includes the electronic multimedia composition attached as a file (e.g., a pdf or MP3 file.) In some embodiment, access to the electronic multimedia composition is also provided to the initiator and/or one or more contributors that participated in the collaborative creation process. In some embodiments, the electronic multimedia composition with the collaborative multimedia contents is saved in the system (e.g. a database associated with the server hosting the website) and can be accessed and viewed by recipient(s), initiator(s) and/or contributor(s).

In addition, in certain embodiments, the electronic multimedia composition can be downloaded from the system and saved as a local file on a computing device of the recipient, initiator and/or contributor. The saved local file can be used to display the electronic multimedia composition as a wallpaper or screensaver on the computing device. For example, the initiator, contributor and/or recipient may wish to see the received electronic multimedia composition regularly by accessing it via the URL or by saving the composition as a local file to be viewed as a wallpaper on the recipient's computing device. In certain embodiments, the animated features displayed in the completed electronic multimedia composition can be featured on the wallpaper or screensaver on the computing device and appears per user controls. In some embodiments, a completed electronic multimedia composition may include interactive features and/or games. For example, a game may display icons or small photographs to a recipient or other user, and, responsive to selection (e.g. by 'shooting' the icon or small photograph in the context of a game) of an icon or small photograph, the particular content from a contributor may be displayed as a larger photograph. In some embodiments, the completed electronic multimedia composition can be saved as a media file to be displayed on the background screen of tablets and smartphones.

In certain embodiments, the completed electronic multimedia composition can also be shared on various social media accounts such as, for example, Facebook, Instagram, Flickr, Google Plus, LinkedIn, Tumblr, Snapchat, MySpace and the like. The completed electronic multimedia composition can also offer multiple printing selections, such as string of linked images, a photo journal, album, mugs, cups, t-shirts, cell phone covers, coffee table books, etc. Other embodiments include selecting and determining custom printing options so that the completed electronic multimedia composition can be printed according to a particular size or format.

Collaborative Multimedia Greeting Card

Embodiments disclosed herein are directed towards computer-implemented systems and methods for generating a collaborative platform so that an initiator and invited contributors can create, collaborate and display a multimedia greeting card.

a. Initiator

Figure 4:
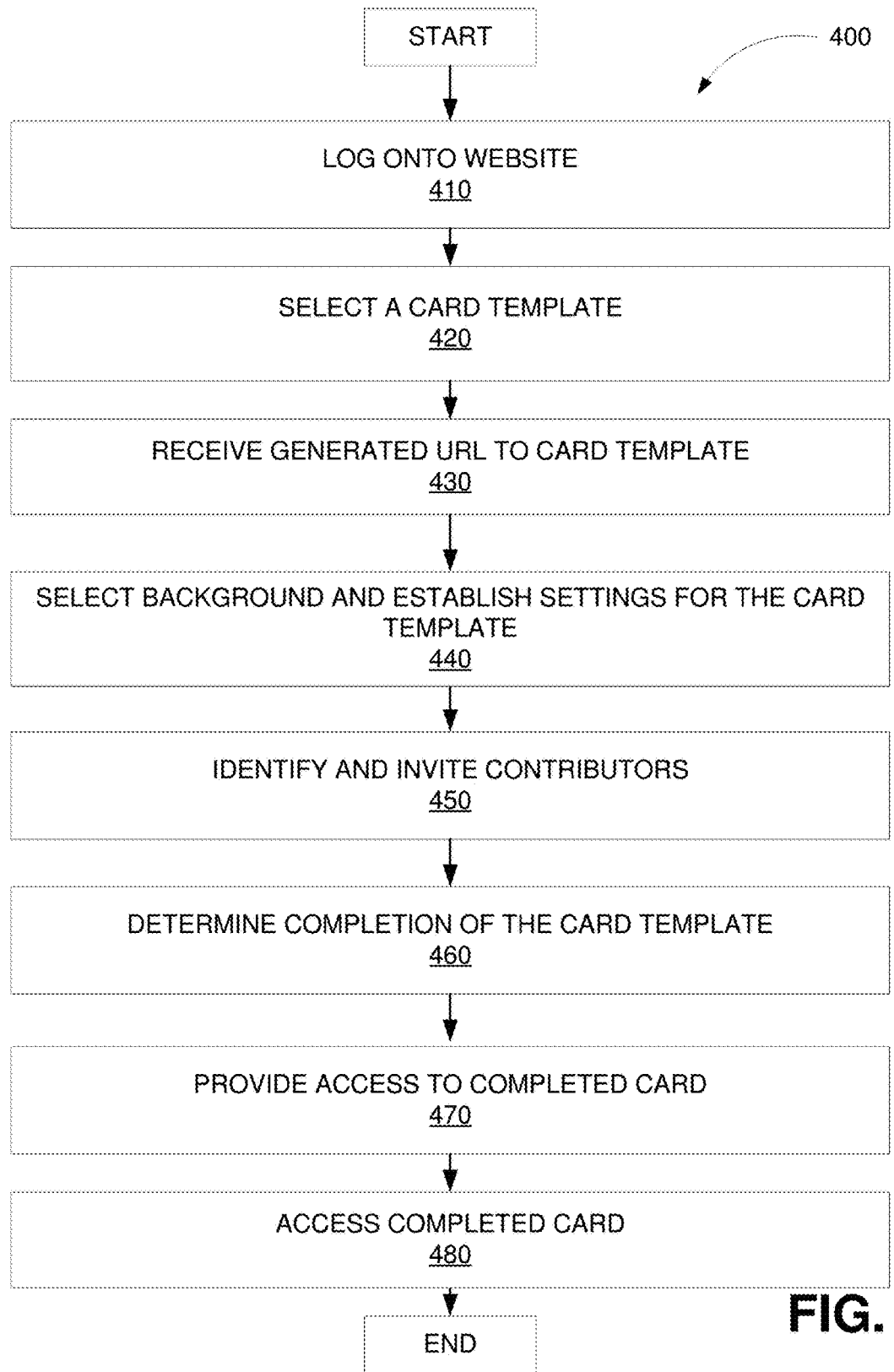
FIG. 4 is a flowchart illustrating an exemplary process for creating and accessing the collaborative multimedia greeting card from the perspective of an initiator according to certain aspects of the present disclosure.

FIG. 4 is a flowchart illustrating an exemplary process 400 for creating and accessing the collaborative multimedia greeting card from the perspective of an initiator according to certain aspects of the present disclosure. The exemplary process 400 facilitates an initiator to create a platform so that users may come together in a virtual setting to create, collaborate and display multimedia content and send the completed greeting card to one or more selected recipients. The exemplary process 400 begins at operation 410, where an initiator accesses a website hosted by a server that includes the tools and services necessary to create a new collaborative greeting card. After the website is accessed, the exemplary process 400 proceeds to operation 420, where the initiator proceeds to choose a card template from a plurality of preloaded card templates with various types of styles and formats provided by the website. In some embodiments, the initiator can select and upload his or her own card template from a computing device.

Figure 5:
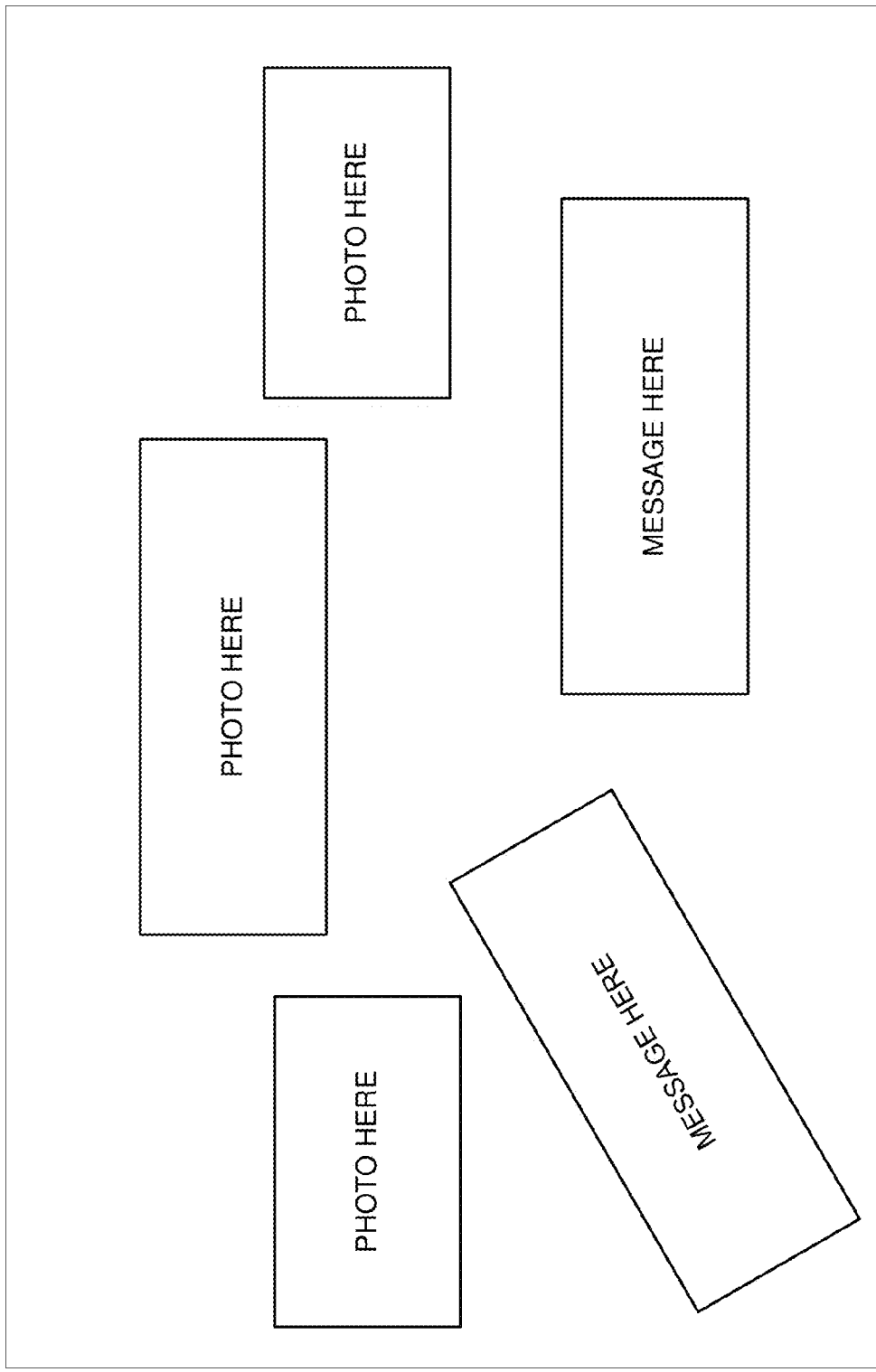
FIG. 5 illustrates an exemplary card template with fields that specify where messages and photos can be added and uploaded to the card template in which various embodiments of the present disclosure can be implemented.

The card template can create a collaborative platform where a group of users, such as an initiator and invited contributors, gather in a virtual setting to create a collaborative greeting card. A card template can also function as pre-determined page layout where particular areas or fields are indicated to show where the initiator and contributors can add messages and upload multimedia content (e.g. photo's, captions, etc.). By way of example, FIG. 5 illustrates an exemplary card template that includes particular fields that specify where messages and photos can be added and uploaded to the card template. In some embodiments, individual messages may be specifically associated with individual photos. For example, a caption of a photograph may be placed near the corresponding photograph.

Figure 6:
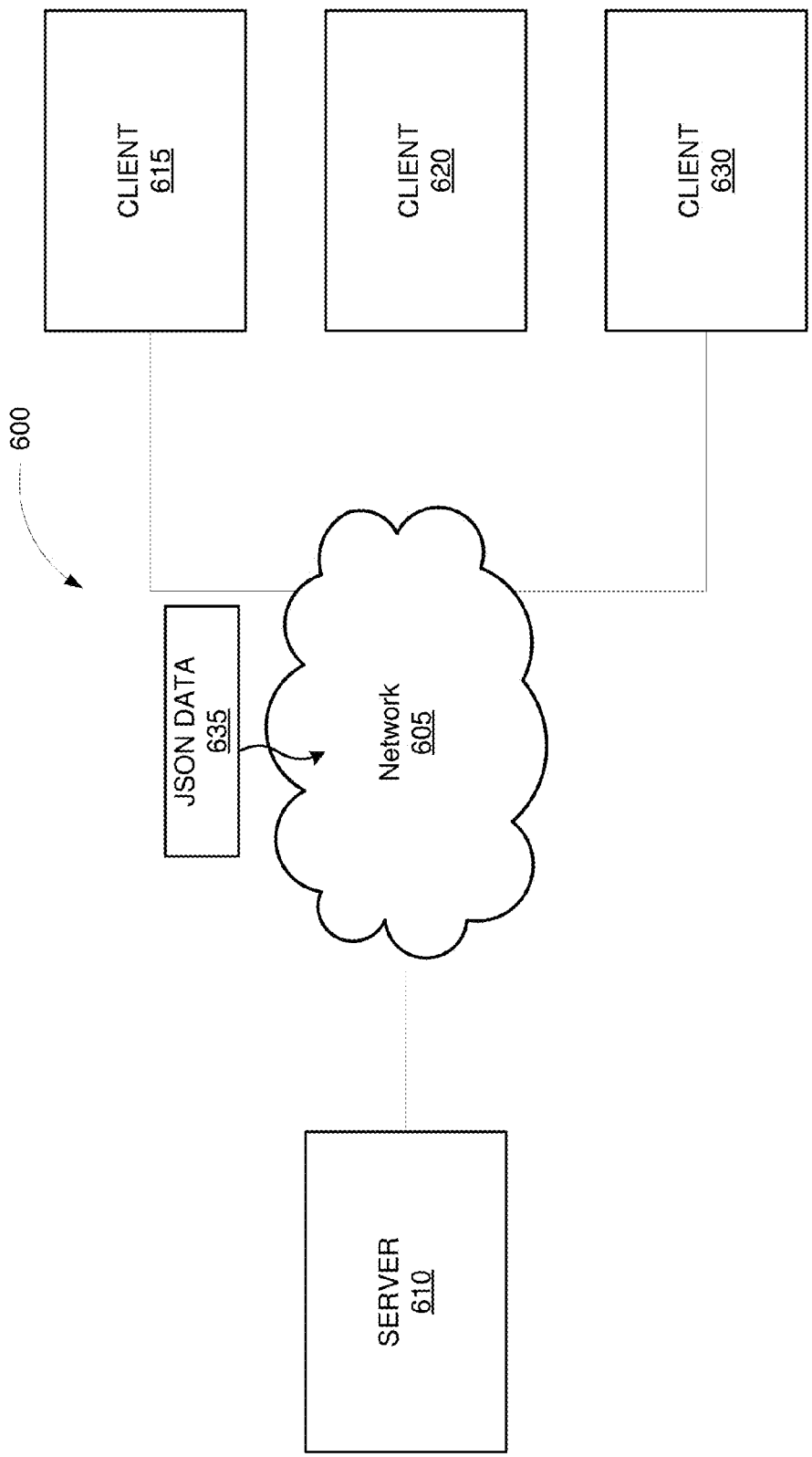
FIG. 6 illustrates an example of a communication system where JSON is implemented to transfer data between a server and clients through a network according to certain aspects of the present disclosure.

By way of further example, the card template can also include a preview feature, which seamlessly incorporates and displays changes (e.g., additions, deletions, and/or modifications) made to the card template without having to refresh the entire web page, allowing the implemented changes to be immediately updated and displayed in real time. The preview feature advantageously avoids the need to send the entire webpage content each time a change is made to the template, which may strain the network bandwidth and server workload. The preview feature can be achieved by the use of JavaScripts such as asynchronous JavaScript ("AJAX") and/or JavaScript object notation ("JSON"), where data is sent and retrieved without interfering with the display and behavior of the existing webpage. FIG. 6 illustrates an example of a communication system 600 where JSON is implemented to transfer data between a server 610 and clients 615-630, who can be an initiator(s), contributor(s) and/or recipient(s), through a network 605. JSON data 635 can also utilize AJAX techniques, where the JSON data 635 is incorporated into webpage the moment JSON data 635 exchanges data and message between the network 605 and the server 610, resulting in no interference with the display of the current webpage. As a result, clients 615-630 can implement and view changes to the card template in real time without having to manually refresh or interfere with the display of the existing webpage, enhancing user experience.

Upon the selection of a card template, the exemplary process 400 proceeds to operation 430, where a unique web address is generated and assigned to the card template selected by the initiator. By way of example, a unique web address can be a uniform resource locator ("URL") that corresponds to the location of the selected card template on the network. Furthermore, any changes and updates implemented to the card template may be saved and accessible through the assigned URL. In some embodiments, the assigned URL address can remain constant throughout the entire process of creating, collaborating and displaying the collaborative multimedia content and sending the completed greeting card to one or more selected recipients. With the assigned URL generated to save and locate a selected card template on a network, the initiator can proceed to invite contributors to access the card template to begin adding messages and multimedia content.

Prior to sending invitations to contributors to access the card template saved on the network, the initiator can implement certain basic decorative features and administrative aspects to the card template. Thus, the exemplary process 400 proceeds to operation 440, where a background for the card template is selected and one or more settings for the card template are established. In some embodiments, the initiator can choose from a wide range of preloaded background selections available on the website that reflect the various styles, themes and designs that can be incorporated to the card template. For example, some of the background selections can include themes depicting common holidays, colorful illustrations and designs, photos of famous landmarks and the like. In other embodiments, the initiator may select his or her own background selection uploaded from the initiator's computing device. In some embodiments, implementing a background can also include selecting a message or messages (e.g., text, picture, animation, game, and/or video) from a list of preloaded messages associated with the selected background. The selecting a background operation 440 can also include uploading a message or messages (e.g., text, picture, animation, game, and/or video) from the initiator's computing device. In certain embodiments, preloaded background selections available on the website for the card template may contain animated features, musical pieces, licensed musical arrangements, and/or characters from licensed films, books and TV cartoon shows.

Figure 7:
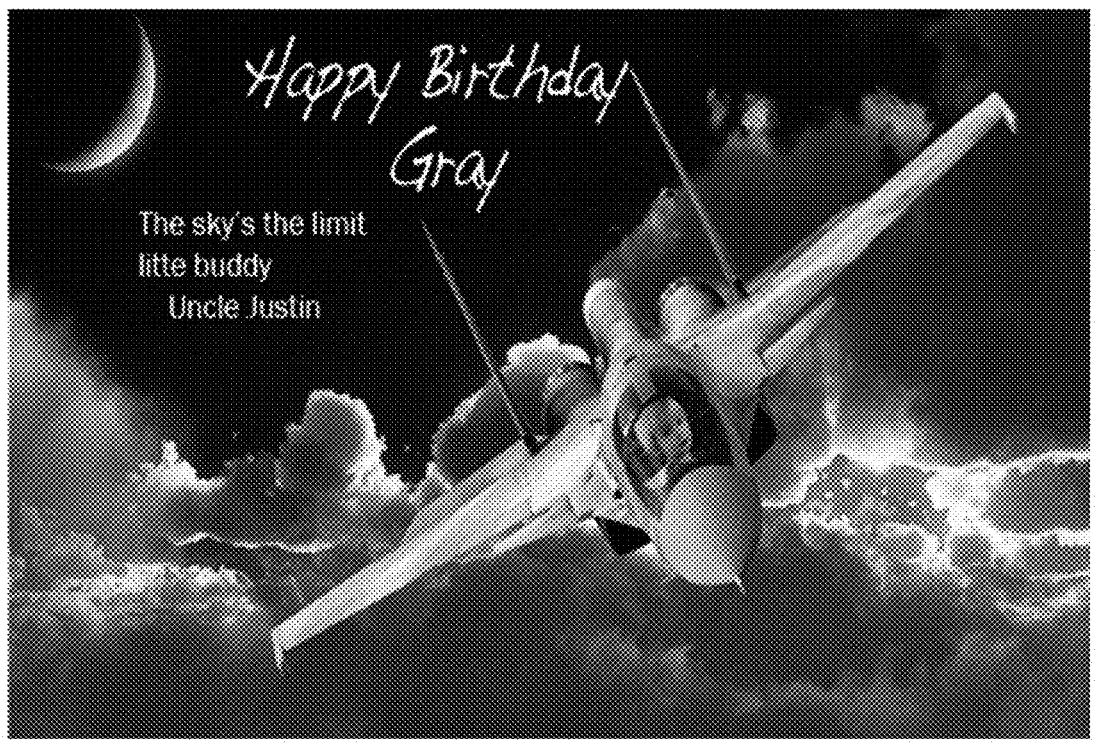
FIG. 7 depicts an image of an airplane background used to frame the picture of a young boy.
Figure 18:
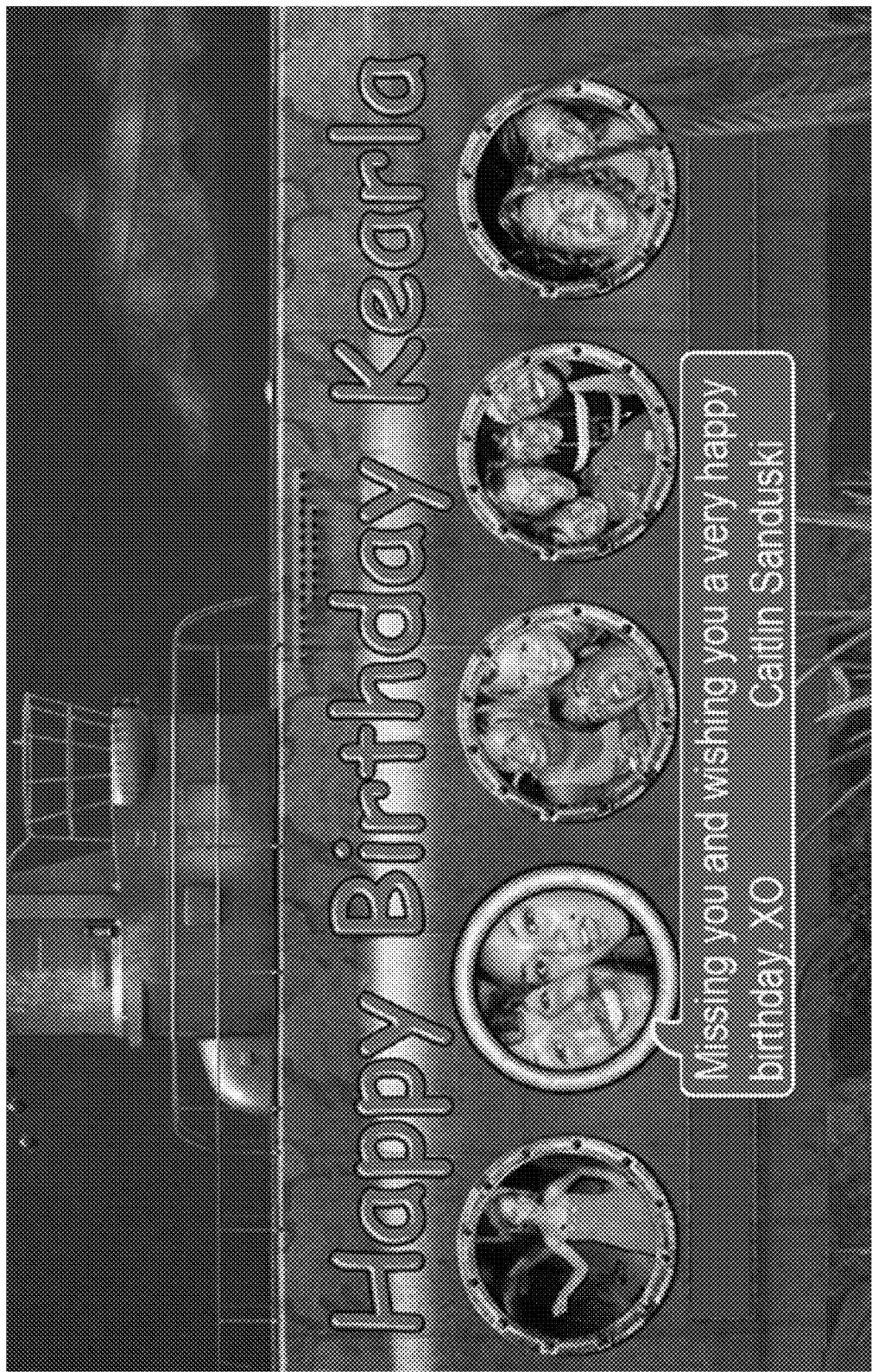
FIG. 18 depicts an image of a submarine used to frame the images of a birthday card.

Other background selections can include various selections of frames and borders to place around the edges of the template card. In some embodiments, the selection of background images may include images, pictures and photographs of various vehicles, such as ships, trains, cars, vans, buses, airplanes, submarines and the like. The window frames of the background vehicle images can contain a field to place a photo, creating the illusion as if the person in the picture is riding the background vehicle image. As an illustrative example, FIG. 7 depicts an image of an airplane background used to frame the picture of a young boy. By placing and framing the picture of the young boy in the window of the airplane, the illusion of a young boy flying the airplane is created, while also enhancing the overall theme of the greeting card. As an illustrative example, FIG. 18 depicts an image of a submarine background used to frame pictures used to create a birthday card/composition.

Furthermore, the photos placed within the multimedia content fields can be manipulated to be rotated, enlarged, minimized, cropped, or skewed to ensure the uploaded photo is neatly placed within the background frames or multimedia content fields. Referring back to FIG. 7, it illustrates an uploaded picture that is strategically cropped and rotated so that the picture is neatly placed within the boundaries of the background frame, or in this instance, an airplane window. The initiator can also add other decorative features onto the card template with various design tool selections, such as font styles, font sizes, colors, various border styles, border size selections, animations, animated drawings, and sounds clips.

In certain embodiments, the initiator can establish certain administrative settings. For example, the initiator can lock certain multimedia content fields of the template so that only he or she can manipulate or edit the selected fields. For example, if the initiator does not wish any of the invited contributors to edit or delete the title of the card template or change the selected background framing the picture of the selected recipient, the initiator can choose to lock those specified fields. In some embodiments, the initiator can elect to share such administrative features by selecting a contributor or group of contributors who may continue to make changes to the locked fields while the remaining non-selected contributors cannot edit the locked fields. In certain embodiments, the initiator can elect not to lock any of the multimedia fields in the card template so that any of the contributors can edit and update the multimedia fields.

The initiator can also establish other administrative settings, such as selecting one or more recipients to receive the completed electronic greeting card created from the card template. In certain embodiments, the authority to determine the one or more recipients to receive the completed electronic greeting card can be solely vested with the initiator. In other embodiments, the authority can be shared. For example, the initiator can elect to share the decision making process with a contributor or a group of selected contributors. In some embodiments, the initiator can allows any invited contributor to add or edit the list of recipients to receive the completed greeting card throughout the collaborative process.

Once the background is selected and the desired settings are established for the card template, the exemplary process 400 proceeds operation 450, where the initiator identifies and invites a contributor or group of contributors to participate in the process for creating a collaborative electronic greeting card. The operation 450 can include the initiator identifying a list of contributors to invite. The invitations sent to selected contributors include the URL associated with the selected card template located and saved on the network. By way of example, the initiator can invite collaborators by notifying them through various social media or online messaging sites, such as, but not limited to, Whatsapp, Facebook, Instagram, Flickr, Google Plus, LinkedIn, Tumblr, Snapchat, MySpace, e-mail, text messaging, and the like. In further embodiments, the invitation may include a RSVP feature, allowing the invited contributors to notify the recipient whether the contributor intends to accept or decline the invitation to participate in the process for creating a collaborative electronic greeting card. The RSVP feature can be helpful to the initiator to help determine whether more potential contributors should be invited in creating a collaborative electronic greeting card.

In some embodiments, the animations implemented on the card template can be activated as audio reactive visuals that respond to real-time audio. For example, an audio input on a computing device may extract the sound volume, frequency, or beats per minute in the room and activate selected animations to react according to the level of audio intensity. In some embodiments, colors, patterns, texts and specified animations can react according to the sound volume extracted from the room.

Figure 19:
FIG. 19 illustrates an example of a user interface that may be used to invite other users to contribute to a collaborative electronic multimedia composition in accordance with various embodiments of the present disclosure.

In some embodiments, the card template includes a gifting application allowing the initiator to attach a cash gift to the card template. By way of non-limiting example, the cash gift application can include sending cash electronically via PayPal, Venmo, Bitcoin Wallet, various mobile payment applications, and the like. In some embodiments, the cash gifting application can include a group gifting feature, allowing contributors to add and collect money as a group, thus creating a group gift. In certain embodiments, a group gift can include a charitable donation or political campaign contribution. As an illustrative example, FIG. 19 depicts an example of a user interface that may be used to invite other users to contribute or participate in political issues.

In certain embodiments, the initiator can add sound track medleys from a library of licensed music content selections available on the website. The initiator can also add a variety of sound track medleys uploaded from the initiator's own computing device. In certain embodiments, the initiator can also compose a track of original music through the features and services provided on the website. For example, the website may provide a software featuring a range of realistic, sampled instruments and editing features to create original compositions. In some embodiments, the initiator can initiate the creation of a group collaboration composition, where the initiator and/or contributors may collectively work together to compose a track of original music for the recipient. In certain embodiments, the initiator can incorporate other sound features to the card template, such as enabling animation reactivity controls. The animation reactivity feature causes animations placed on the card template to react and respond based on the level, pitch, and/or decibel sounds noises displayed in the room.

In certain embodiments, the initiator can monitor the contents of the card template by being able to view messages and multimedia content added to the card template. This monitoring process allows the initiator to determine whether more participation encouragement is needed, such as resubmitting invitations or sending out new invitations to more potential contributors. In other examples, the initiator can monitor the contents of the interactive card template so that the initiator can edit or delete any content deemed subjectively inappropriate for the greeting card to be sent to the recipient. In certain embodiments, the initiator can restrict contributors from viewing the messages and multimedia content added by other contributors, allowing contributors to only view content he or she has added to the card template. In some embodiments, the initiator can allow the invited contributors to see only some of the uploaded messages and content the initiator selectively allows. In other embodiments, the initiator may allow the invited contributors to see all added messages and uploaded content placed onto the card template.

The exemplary process 400 proceeds to operation 460, where a completion of the card template is determined. In certain embodiments, the initiator can place a pre-determined time limit for completing the collaborative card creating process. When the pre-determined time limit has passed, the fields on the interactive card template become locked, preventing contributors from making any further changes, such as adding an additional picture or making additional edits to the card template. The initiator, however, can have the option to override any of the locked features so that any final changes can be implemented by the initiator and/or the contributors before sending the completed card template as a greeting card to the identified recipient. In some embodiments, the initiator can subjectively determine to end the collaborative card creating process when he or she believes that no more changes to the card template are necessary, or when there is little to no more participation from the contributors. In certain embodiments, when the card template is completely filled and ready to be sent as a greeting card, all the fields on the template become permanently locked, which prevents any additional changes or updates to the card template and causes the card template to be converted into a completed electronic greeting card.

The exemplary process of 400 proceeds to operation 470, where the initiator causes the system to provide one or more selected recipients an access to the completed electronic greeting card. The operation 435 can include the initiator authorizing the website to send a notification, which can include an URL address associated with the completed greeting card to the recipient. In certain embodiments, the URL address included in the notification is the same URL address associated with the selected and collaborated card template. Thus, the recipient may view the completed greeting card using the same URL address used to complete the card template.

In some embodiments, the initiator can also determine who can view the completed greeting card. For example, the initiator can allow anyone in the general public to view the greeting card, resulting in an open circulation of the greeting card. As long as anyone knows the URL associated with the greeting card, the card may be viewed by anyone. In other embodiments, the initiator can place a restrictive access, allowing only the selected recipients and contributors who participated in creating the electronic card to access and view the completed greeting card. In some embodiments, the initiator can also decide to only allow certain selected contributors to access and view the completed greeting card.

Figure 8:
FIG. 8 is an illustrative example of a completed greeting card displayed as a stand-alone layer wallpaper on a computing device.
Figure 9:
FIG. 9 illustrates a locally saved greeting card displayed as a screensaver on the screen of a desktop computer.

In some embodiments, the exemplary process 400 proceeds to operation 480, where the initiator accesses the completed electronic card outside the website. For example, the operation 480 includes the system allowing the initiator to access the completed greeting card outside the URL address associated with the completed greeting card. As a result, the initiator can first access the completed greeting card on the web browser via the URL and then download and save the completed greeting card as a local file on his or her computing device. FIG. 8 is an illustrative example of a completed greeting card displayed as a stand-alone layer wallpaper on a computing device. In some embodiments, the completed greeting card can be saved as a local file and displayed as a screensaver, slideshow or image on the computing device. As an example, FIG. 9 illustrates a locally saved greeting card displayed as a screensaver on the screen of a desktop computer. In certain embodiments, the additional personalization features can be incorporated to the locally saved greeting card, which can include adjusting and/or adding frequency, sound, speed, color, and animations. For example, a completed greeting card with a decorative background featuring 19$^{th}$ century steam train and photos of contributors placed in the steam train windows can be locally saved and programmed on the desktop computer to appear and blow its horn once per hour and race across the desktop while the user continues to work on the computer.

The locally saved greeting card can also be displayed on the home and background screen of tablets and smartphones.

In other embodiments, the greeting card may also be viewed through various different social media accounts, such as but not limited to, Facebook, Instagram, Flickr, Google Plus, LinkedIn, Tumblr, Snapchat, MySpace and the like.

The completed greeting card can also offer multiple printing options and selections. For example, a selected printing option may allow the initiator to print a string of collaborative and linked images. Other embodiments include selecting and determining custom printing options so that the completed greeting card can be printed according to a particular size or format. As another example, the initiator can print the completed greeting card as a photo journal and/or album. In certain embodiments, the completed greeting card can be placed on a thin video screen, allowing the animated features and multimedia content to be displayed.

b. Contributors

Figure 10:
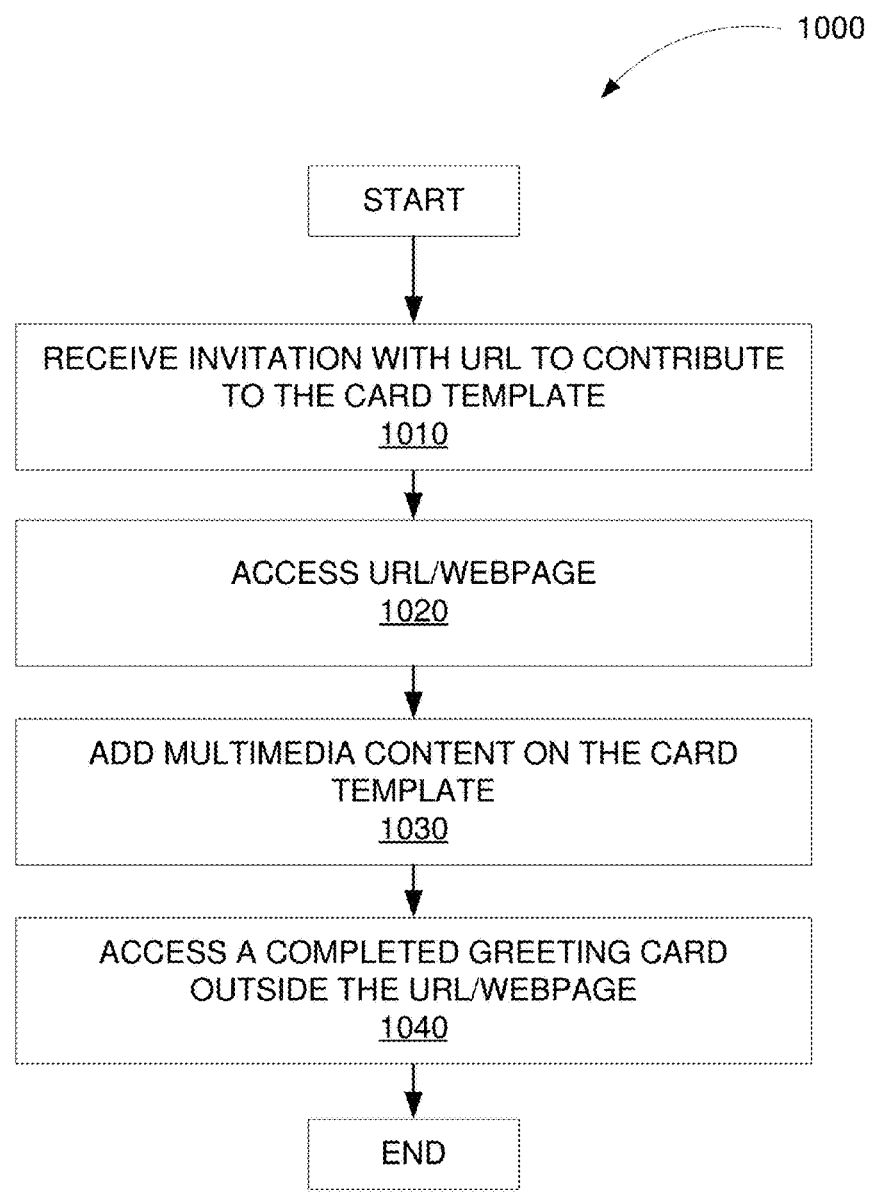
FIG. 10 is a flowchart illustrating an exemplary process for creating and accessing the collaborative multimedia greeting card from the perspective of a contributor according to certain aspects of the present disclosure.

FIG. 10 is a flowchart illustrating an exemplary process 1000 for creating and accessing the collaborative multimedia greeting card from the perspective of a contributor according to certain aspects of the present disclosure. The exemplary process 1000 facilitates contributors to collaborate and participate in creating a greeting card through a platform established by an initiator. The exemplary process 1000 proceeds to operation 1010, where a contributor receives an invitation to participate in the process of creating a collaborative greeting card. The invitation can be accompanied with a URL address so that the invited contributor can locate the created card template saved onto the network. By way of example, the contributor can receive an invitation notification via Facebook, Instagram, Flickr, Google Plus, LinkedIn, Tumblr, Snapchat, MySpace, e-mail and the like. In certain embodiments, only the initiator can send invitations to contributors to access the greeting card template. In other embodiments, the initiator shares the authority to invite collaborators and allow selected or all contributors to invite potential contributors to participate in creating the collaborative greeting card.

The exemplary process 1000 proceeds to operation 1020, where the invited contributor accesses the collaborative greeting card template by, for example, selecting or typing the received URL on the web browser. In some embodiments, the contributor can be required to create a login account before being able to access the card template on the network. In other embodiments, a login account is not required and the contributor may instantly accesses the webpage featuring the card template. Once the contributor accesses the card template, the contributor can begin adding personalized messages and decorative features with different design tool selections, such as font styles, font sizes, colors, various border styles, border size selections, animations, animated drawings, and sounds clip. In some embodiments, however, the contributor can add messages and multimedia content only in fields not locked by the initiator and/or only in fields designated for contributors or the particular contributor by the initiator.

The exemplary process of 1000 proceeds to operation 1030, where the contributor adds multimedia content on the card template. In certain embodiments, the contributor can add sound track medleys from a library of licensed music content selections available on the website. If the initiator has locked the feature, the contributor has no authority or option to implement such audio features unless initiator grants the contributor access. If such a feature is not locked, the contributor can also add a variety of sound track medley uploaded from the initiator's own computing device. In certain embodiments, the contributor can also compose a track of original music from the range of musical styles and notes provided by software available on the website featuring a range of realistic, sampled instruments and editing features to create original compositions. If the initiator has already created a collaborative composition, the contributor may add parts of a composition to a track of original music.

In some embodiments, a photo saved in the contributors' computing device as a local file or a photo saved in another location (e.g., a photo-sharing website and/or cloud-based photo storage) can be uploaded and placed in the background frames selected by the initiator, where the photo can be further rotated, enlarged, minimized, cropped, or skewed to ensure the uploaded photo is placed within appropriate boundaries of the card template. Referring back to FIG. 7, the figure further illustrates a selected picture that is strategically cropped and rotated so that the picture is neatly placed within the boundaries of the window frame of the background airplane image. By strategically cropping and tilting the picture to fit within window frame, a more realistic visual effect is created, while enhancing the theme of the electronic greeting card.

In some embodiments, the contributor can attach a gift in the gifting application. By way of non-limiting example, the gift application may include sending cash via PayPal, Venmo, Bitcoin Wallet, mobile payment applications, and the like. In other examples, the gifting application may be a group cash gifting application so that the initiator or any other contributors may add money contributions as a group gift. In other embodiments, the gift may include goods and services via selected merchants and third party partners.

In certain embodiments, the initiator can pass all or some of the monitoring process to a selected contributor so that the selected contributor can, solely or jointly with the initiator, monitor the contents added to the greeting card template. The selected contributor monitors the contents of the card template in order to edit or delete content deemed inappropriate for the greeting card. This monitoring process also allows the selected contributor to determine whether more participation encouragement is needed, such as resubmitting invitations or sending out new invitations to more potential contributors. Furthermore, monitoring the greeting card template allows the contributor to determine when the greeting card template is complete and ready to be converted and sent to the selected recipient as a completed greeting card.

When the card template is completed and ready to be sent to the recipient as a greeting card, the features of the collaborative greeting card template are locked so that all editing features are disabled. The locked card template is then converted into a completed greeting card ready to be sent to the selected recipient.

The exemplary process 1000 proceeds to optional operation 1040, where the contributor can access the completed greeting card outside the URL address associated with the greeting card creation process. After first accessing the completed greeting card on the network via the URL, the contributor can download and save the greeting card as a local file and display the greeting card as a stand-alone layer wallpaper on a computing device. In some embodiments, the completed greeting card can be saved a local file and displayed as a screensaver, slideshow or image on the computing device. In certain embodiments, the locally saved greeting card can include further personalization features, which includes adjusting and/or adding frequency, sound, speed, color, and animations. The locally saved greeting card can also be displayed on the home and background screen of tablets and smartphones. In other embodiments, the greeting card may also be viewed through various different social media accounts, such as, but not limited to, Facebook, Instagram, Flickr, Google Plus, LinkedIn, Tumblr, Snapchat, MySpace and the like.

The completed greeting card can also offer multiple printing options and selections. For example, a selected printing option may allow the initiator to print a string of collaborative and/or linked images. In another example, the initiator may print the completed greeting card as a photo journal and/or album. Other embodiments include selecting and determining custom printing options so that the completed greeting card can be printed according to a particular size or format. In certain embodiments, the completed greeting card can be placed on a thin video screen, allowing all of the animated features and multimedia content to be displayed.

c. Recipient

Figure 11:
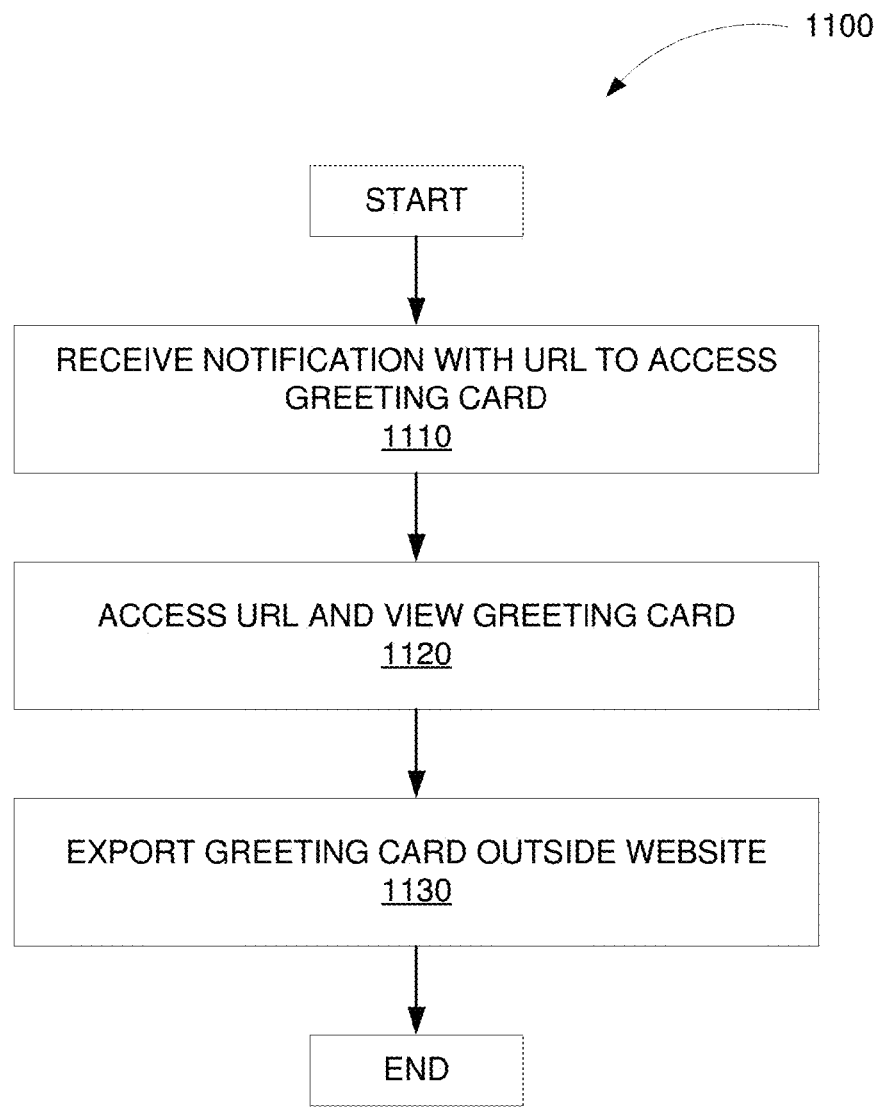
FIG. 11 is a flowchart illustrating an exemplary process for accessing the collaborative multimedia greeting card from the perspective of a recipient according to certain aspects of the present disclosure.

FIG. 11 is a flowchart illustrating an exemplary process 1100 for accessing the collaborative multimedia greeting card from the perspective of a recipient according to certain aspects of the present disclosure. The exemplary process 1100 begins at operation 1110, where the recipient receives a notification to access a completed greeting card. For example, the recipient may receive an invitation via Facebook, Instagram, Flickr, Google Plus, LinkedIn, Tumblr, Snapchat, MySpace, e-mail and the like to notify the recipient.

The notification to the recipient can include the URL associated with the card template selected by the initiator, where the completed card template includes contributions made by the initiator and/or one or more contributors has been converted into an electronic greeting card. The exemplary process of 1100 proceeds to operation 1120, where the recipient accesses the greeting card by selecting the provided URL. In some embodiments, the recipient can be required to create a login account before being able to access the completed greeting card. In other embodiments, the login account is not required and the recipient can immediately navigate to the webpage featuring the completed greeting card.

Figure 12:
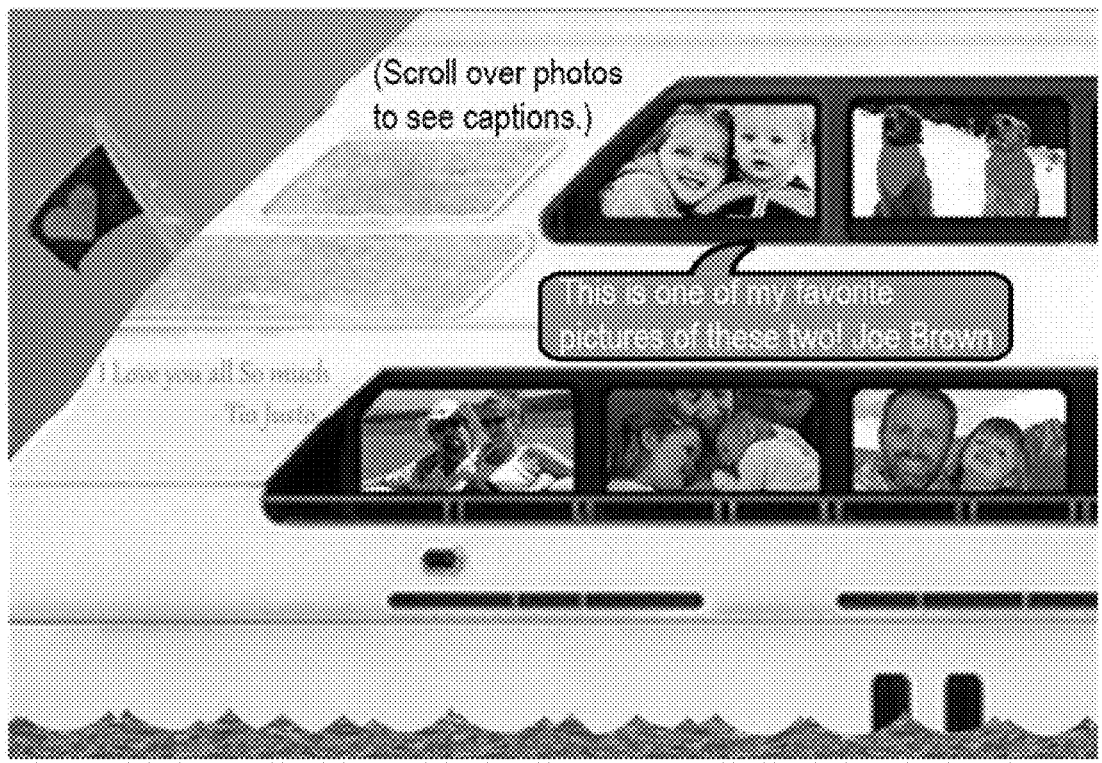
FIG. 12 illustrates an example of a completed greeting card that is sent to a selected recipient.

FIG. 12 illustrates an example of a completed greeting card that is sent to a selected recipient. The recipient can access the completed greeting card via the URL address provided in the operation 1120, but the recipient may also select various viewing options for the electronic card. For example, the exemplary process 1120 proceeds to optional operation 1130, where the recipient can download the completed electronic greeting card from the URL and save the greeting card as a local file on a computing device. In some embodiments, the locally saved greeting card is displayed as a stand-alone layer wallpaper on a computing device. In some embodiments, the completed greeting card can be saved a local file and displayed as a screensaver, slideshow or image on the computing device. In certain embodiments, the locally saved greeting card can include further personalization features, which includes adjusting and/or adding frequency, sound, speed, color, and animations. The locally saved greeting card can also be displayed on the home and background screens of tablets and smartphones. In other embodiments, the greeting card may also be viewed through various different social media accounts, such as, but not limited to, Facebook, Instagram, Flickr, Google Plus, LinkedIn, Tumblr, Snapchat, MySpace and the like.

The completed greeting card can also offer multiple printing options and selections. For example, a selected printing option may allow the recipient to print a string of collaborative and/or linked images. In another example, the recipient may print the completed greeting card as a photo journal, album, mugs, cups, t-shirts, cell phone covers, coffee table books, etc. Other embodiments include selecting and determining custom printing options so that the completed greeting card can be printed according to a particular size or format. In certain embodiments, the completed greeting card can be placed on a thin video screen, allowing all of the animated features and multimedia content to be displayed.

Collaborative Photo Album

Figure 13:
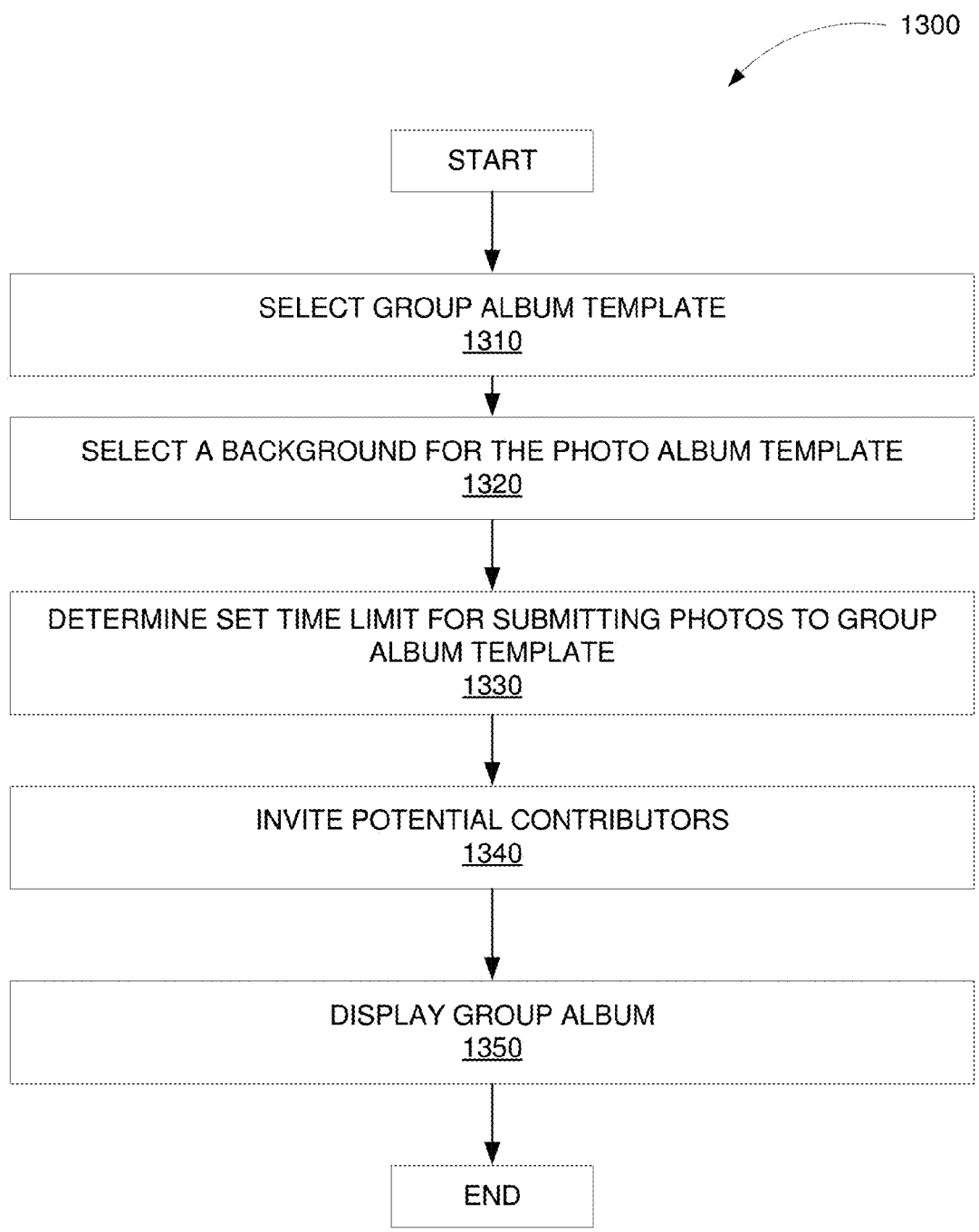
FIG. 13 is a flowchart illustrating an exemplary process for creating and accessing a collaborative group photo album in accordance with certain aspects of the present disclosure.

Embodiments disclosed herein are directed towards computer-implemented systems and methods for generating a collaborative platform so that an initiator and attendees of a live event may collaborate to create and display a group album, which may include by example, photos, videos, messages or any combination listed above. FIG. 13 is a flowchart illustrating an exemplary process 1300 for creating and accessing a collaborative group photo album in accordance with certain aspects of the present disclosure.

Initiator

The exemplary process 1300 facilitates creating a collaborative group album to be collaborated and displayed during the course of a live event, such as concerts, basketball games, clubs, birthday parties and the like. By way of example, a promoter for a live concert may wish to create and display a collaborative group album comprising of photographs taken by a group of concert attendees during the course of the live event on TV monitors within the venue or live streaming on social media.

Referring to FIG. 13, the exemplary process 1300 begins at operation 1310, where a platform for creating, collaborating and displaying a group album is created when the initiator selects an album template. A wide selection of template choices with various types of styles and formats may be available on a website hosted by a sever that includes tools and services for creating a new collaborative group album. In some embodiments, the initiator can select and upload his or her own album template saved as a local file in a computing device. In some embodiments, the initiator can collaborate with a third party to customize an album template featuring distinguishing aspects of the venue or public event. In other examples, the initiator may create a business relationship and collaborate with a third party to create a template featuring advertising material. Thus, the customization of the album template is flexible to meet the specific design needs and purposes of the initiator of the collaborative group album. For example, in some embodiments, the systems and methods described in this disclosure may be used for commercial usage. Commercial usage where a different business contract is entered into by a commercial entity (advertiser) and a provider of the tools and services described herein can involve the advertiser displaying their add on social media sites where the photos of contributing participants are displayed. Users can be automatically shown the images of people they are connected with on social media platforms first or exclusively. This also applies to political campaigns where for promotional purposes, as illustrated in FIG. 19, a candidate displays the photos and comments (multimedia content) of his or her supporters. This also applies to political forums where contributors may or may not agree on issues.

The album template creates a collaborative platform where attendees of a live event can create a collaborative group album and share it amongst friends upon the completion of the group album. The album template can also include pre-determined areas or fields that the initiator and/or contributors can add messages and upload photos and videos. Furthermore, the album template can also include a preview view feature, which seamlessly incorporates and displays changes made to the album template without having to refresh the entire webpage, allowing the implemented changes to be immediately updated and displayed in real time. The webpage may utilize JavaScripts such asynchronous JavaScript ("AJAX") or JavaScript notation ("JSON") to send and retrieve data from the server to the clients (e.g., computing devices of the initiator and contributors) without interfering the display and behavior of the existing webpage.

Upon the initiator's selection of a template for the group album, a unique web address is generated and assigned to the selected album template. For example, for each collaborative photo album the initiator decides to create, a unique URL address is associated with each album template, where the URL corresponds to the location of the selected album template on the network. Any changes and updates implemented to the album template can be saved and accessible through the URL. In some embodiments, the assigned URL address may remain constant throughout the entire process of creating, collaborating and displaying the collaborative photo album.

Before allowing contributors (e.g., attendees of a live event) to participate in the creation process for the new group album (e.g., by submitting their photos, videos and/or messages), the initiator can first decorate the album template. The exemplary process 1300 proceeds to operation 1320, where the initiator can select a background for the album template. The initiator can choose a background from a wide range of background selections available on the website that reflects the wide range of styles and themes an initiator wishes to incorporate to album template. For example, if the group album is to be created and displayed during a live basketball game, the initiator may wish to incorporate a background depicting the logos of the two basketball teams with the stadium name displayed in the corner. As a result, the selection of background choices available on the webpage can contain a wide selection of images, logos, and licensed content of varied subject matter, such as sports teams, films, cartoon characters, brands and the like allowing initiators to create collaborative photo albums for many different types of public venues and events.

The initiator can also incorporate additional decorative features with different design tool selections, such as font styles, font sizes, colors, various border styles, border size selections, animations, animated drawings, and sounds clips. In some embodiments, the initiator can enable a custom sound responsive template, which allows the animations placed in the group template to react and respond to the sounds within the room where the completed group album is displayed. For example, each contributor or participant who views the group album on a computing device, such as a smartphone, will view the animations on the group album that are responsive to the volume, frequency, or beats per minute the computing device extracts from the environment in real-time. Thus, each participating device is independently sound responsive. In other embodiments, the group album displayed on the monitors within the venue can also respond to the extracted ambient sounds of the room, such as the volume, frequency, or beats per minute in real-time. In some embodiments, only the initiator has the authority to incorporate any changes or updates to the multimedia contents placed within the album template. As a result, all or some of the editing features on the album template can be locked by the initiator.

Furthermore, the initiator can implement adjusted controls and administrative settings to manage the features of the collaborative group album. The exemplary process 1300 proceeds to operation 1330, where one or more limits or rules regarding the participation in the creation process for the group album are established. In certain embodiments, the initiator selects a pre-determined time limit for allowing contributors to submit photographs to the group album. For example, the initiator can place the time limit from 5:00 P.M to 12:00 A.M., and by doing so, only photographs submitted from 5:00 P.M. to 12:00 A.M. by contributors can be added to the group album. Any submitted photographs earlier than 5:00 P.M and any photographs submitted after 12:00 A.M. are not incorporated into the group album.

In some embodiments, the initiator can establish a geo-fence perimeter so that only photographs submitted within a predetermined location are accepted and added to the group album. By way of example, the geo-fence perimeter can obtain the current positions of contributors by acquiring the geolocation data from the contributor's mobile device equipped with a location service capability. The location service can provide data indicative of the mobile device's location based on a signal or signals received from one or more of mobile core network 255, WAP 260, cellular BS 270, Bluetooth® emitter 275, NFC terminal 265, GNSS network 250, GNSS satellites 245, internet 215, and/or location server 205 (FIG. 2). As a result, attendees who wish to contribute to the group album are required to enable location services on their mobile devices before submitting photos to the website in order to satisfy with the geo-fence perimeter requirement. For example, the initiator may be a concert promoter and wish to create a photo album only featuring photographs taken inside the concert hall venue. As a result, the initiator can establish a geo-fence perimeter that only allows photographs taken within a 10 feet radius surrounding the concert hall to be accepted and added to the group album.

After a unique URL associated with the created group album template is generated and the limits/rules regarding the contributors' participation are established as mentioned above, the exemplary process 1300 proceeds to operation 1340, where potential contributors are invited to contribute to the group album. The operation 1340 can include displaying the URL address associated with the album throughout the location of the live event so that the attendees are informed and directed to the URL address featuring the group album template created by the initiator. The initiator can further encourage attendees to contribute by sending out various notifications to the attendees and/or friends through text message, social media sites, Whatsapp, Facebook, Instagram, Google Plus, e-mail, Snapchat, MySpace and the like.

The initiator can invite contributors to the group album simply by sending a mass invitation to the mobile devices of all those in attendance who have turned on location services within the geo-fenced area. Contributors can also invite friends also in attendance through social media, email and text message to join the group album in case they did not do so through the invitation of the initiator.

Figure 17:
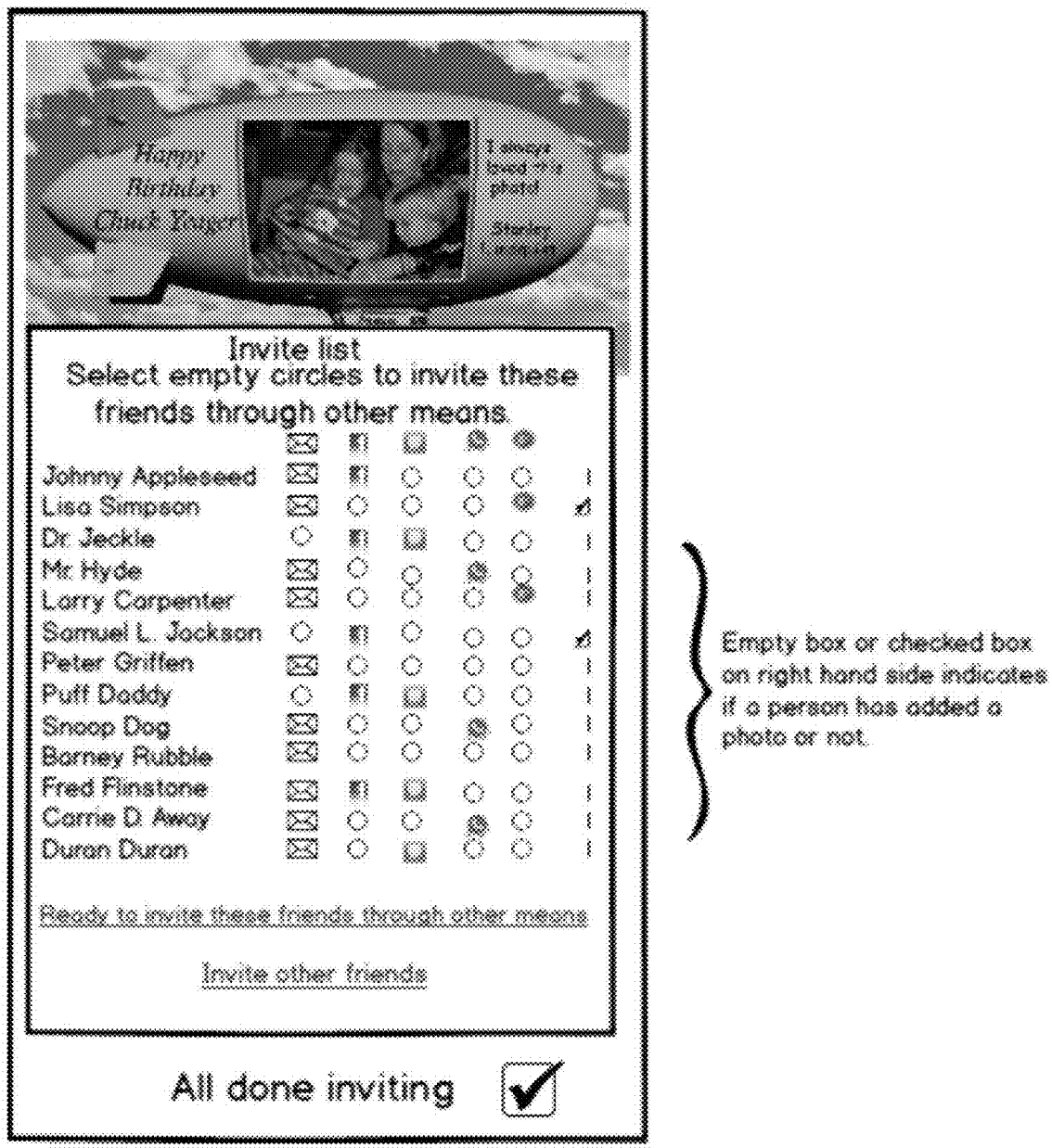
FIG. 17 illustrates an example of a user interface that may be used to invite other users to contribute to a collaborative electronic multimedia composition in accordance with various embodiments of the present disclosure.

By way of illustration, FIG. 17 illustrates an exemplary user interface that an initiator may use to invite contributors to, e.g., a group album. As depicted in FIG. 17, an initiator may check or uncheck circles (or other graphical user interface elements) in the user interface to select or unselect one or more particular type or means of sending an invitation per potential contributor. As depicted in FIG. 17, the particular type of means of sending an invitation may be contributor-specific. As depicted in FIG. 17, a checked box in the same row as a particular contributor may indicate that the particular contributor has contributed a photograph and/or other content to the current collaborative electronic multimedia composition.

When the invited attendees of the live event submit photographs to the group album, the initiator can cause a variety of screens, sub-screens, monitors and projectors to display the collaborative group album. The exemplary process 1300 proceeds to operation 1350, where the collaborative group album is displayed for viewing by the attendees and/or contributors.

The initiator may also incorporate a rewards application with the group album. In some embodiments, a point rewards system is established by allowing contributors to earn points every time they log in to the group album and add a photograph. A varied point system selected by the initiator can be used such that contributors earn points for every time they log in to access the group album or for every photo upload or for when both instances occur. The points earned can be redeemed for various rewards/gifts such as drinks at the bar, brand name T-Shirts, song downloads, etc.

Contributors

Figure 14:
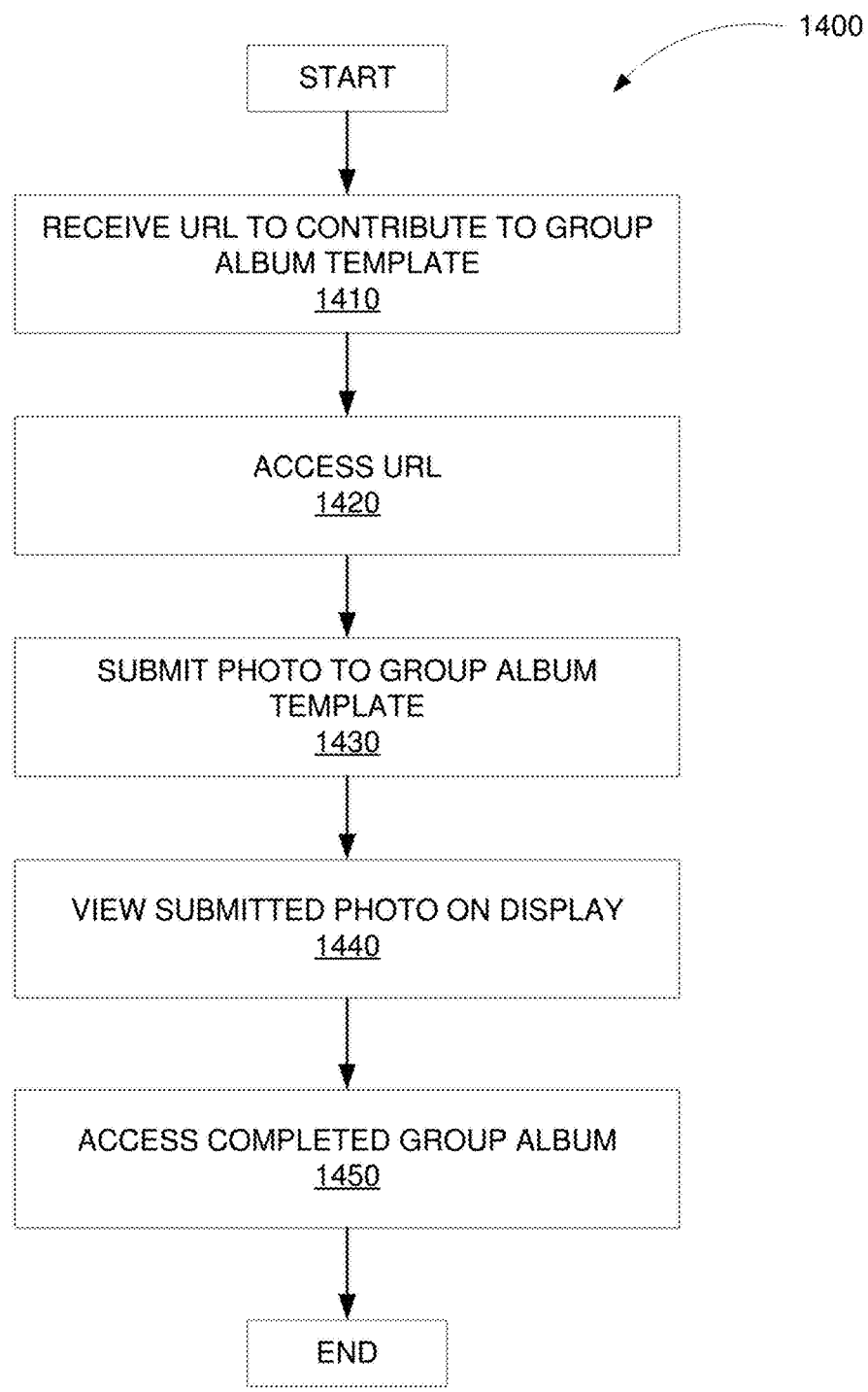
FIG. 14 is a flowchart illustrating an exemplary process for implementing certain embodiments of contributing to a collaborative group photo album in accordance with certain aspects of the present disclosure.

Once the URL is posted to the attendees of the live event by the initiator, the attendees may contribute to the group album by submitting a photo taken during the live event. FIG. 14 is a flowchart illustrating an exemplary process 1400 for implementing certain embodiments of contributing to a collaborative group album in accordance with certain aspects of the present disclosure. Referring to FIG. 14, the exemplary process 1400 begins at operation 1410, where a contributor receives the URL address from the initiator. The exemplary process 1400 then proceeds to operation 1420, where the contributor opens a web browser to access/open the webpage associated with the URL. Upon access to the webpage, the exemplary process 1400 proceeds to 1430, where the contributor can now upload a photo, caption, and/or other content onto the group album template. For example, the photo may be uploaded by selecting a picture that is already saved onto a device, snapping a new picture to upload immediately, or logging onto a social media account and selecting a picture from the social media library. The device for uploading and taking a picture may include, but are not limited to, a smartphone, mobile device, tablet computer, portable media player and the like. Some non-limiting examples of social media accounts with a picture library include Facebook, Instagram, Flickr, Google Plus, Snapchat, MySpace and the like. In some embodiments, the photo album template may include a field for the contributor to input a short message to be displayed with the submitted photograph. The message can be limited to 140 characters or less.

Figure 15:
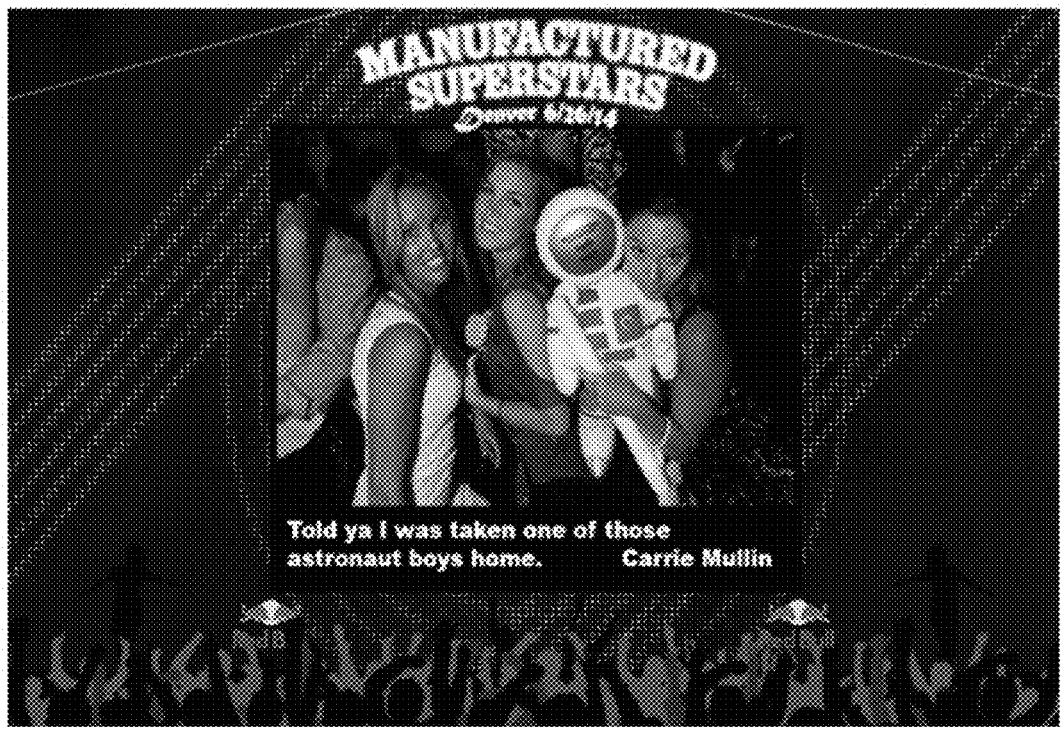
FIG. 15 is an illustrative example of a completed group photo album including a photograph submitted by an attendee of a live event.

FIG. 15 is an illustrative example of a completed group album including a photograph submitted by an attendee of a live event. Referring to FIG. 14, the exemplary process 1400 then proceeds to operation 1440, where the group album is displayed. In certain embodiments, the group album and/or portions thereof can be displayed to give a user a preview. In some embodiments, the contributor may be able to size and (re)place a submitted photo. Upon completion of the group album, the album may be displayed to one or more users in the form of a live photo slide stream displayed on large television screens, monitors and projectors. For example, a concert attendee may decide to contribute to the group album by taking a photograph of herself and a group of her friends enjoying a rock concert at a concert stadium. By snapping the picture and saving it onto her smartphone, she then opens a web browser with her smartphone and types in the URL address displayed on television screens throughout the concert stadium. Once the URL page opens, she sees the group album template containing a field to upload her picture and another field to optionally input a message. A few moments after submitting her photo and message, she and her group of friends can see the submitted picture on the jumbotron located in the middle of the stadium, where the collaborative group album is live and streaming submitted photographs as a slideshow.

In certain embodiments, attendees can submit photographs and messages to the group album via a mobile software application instead of opening a web browser to input the URL address. The attendees can access and view the group photo album by inputting the URL address associated with the photo album template or via a mobile software application. The streaming group album can have interactive features that allow viewers to touch, swipe, click, enlarge or minimize on a selected photo. An attendee viewing the group album may want to contact or meet a particular individual featured in the group album. The attendee may touch, swipe, or click on a selected photo to send an invitation to connect and meet with the selected individual, thus submitting a "find me" invitation feature to the attendee in the selected photo. The "find-me" invitation feature allows people to view the group album and send an invitation to meet or contact the selected individual. If the invitation is accepted, the feature allows the two people to send direct messages to one another. In other embodiments, a map showing the geo-location of the two individuals may result if an invitation is accepted, allowing both individuals to coordinate and meet. The geolocation information of the participants may be obtained from a GPS receiver in mobile devices. When photographs are submitted to the group album, the contributors can be given an option to enable or disable the "find-me" invitation feature.

The exemplary process 1400 may proceed from operation 1440 to operation 1450, where the attendees of the live event and/or the contributors can access the completed group album to view and share with others. For example, the attendees may access the completed group album by retrieving it through the URL address associated with the album template or via the mobile software application. In addition, the attendees can share the accessed group album via text, e-mail, Facebook, Instagram, Flickr, Google Plus, LinkedIn, Tumblr, Snapchat, Twitter, MySpace and the like.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 16:
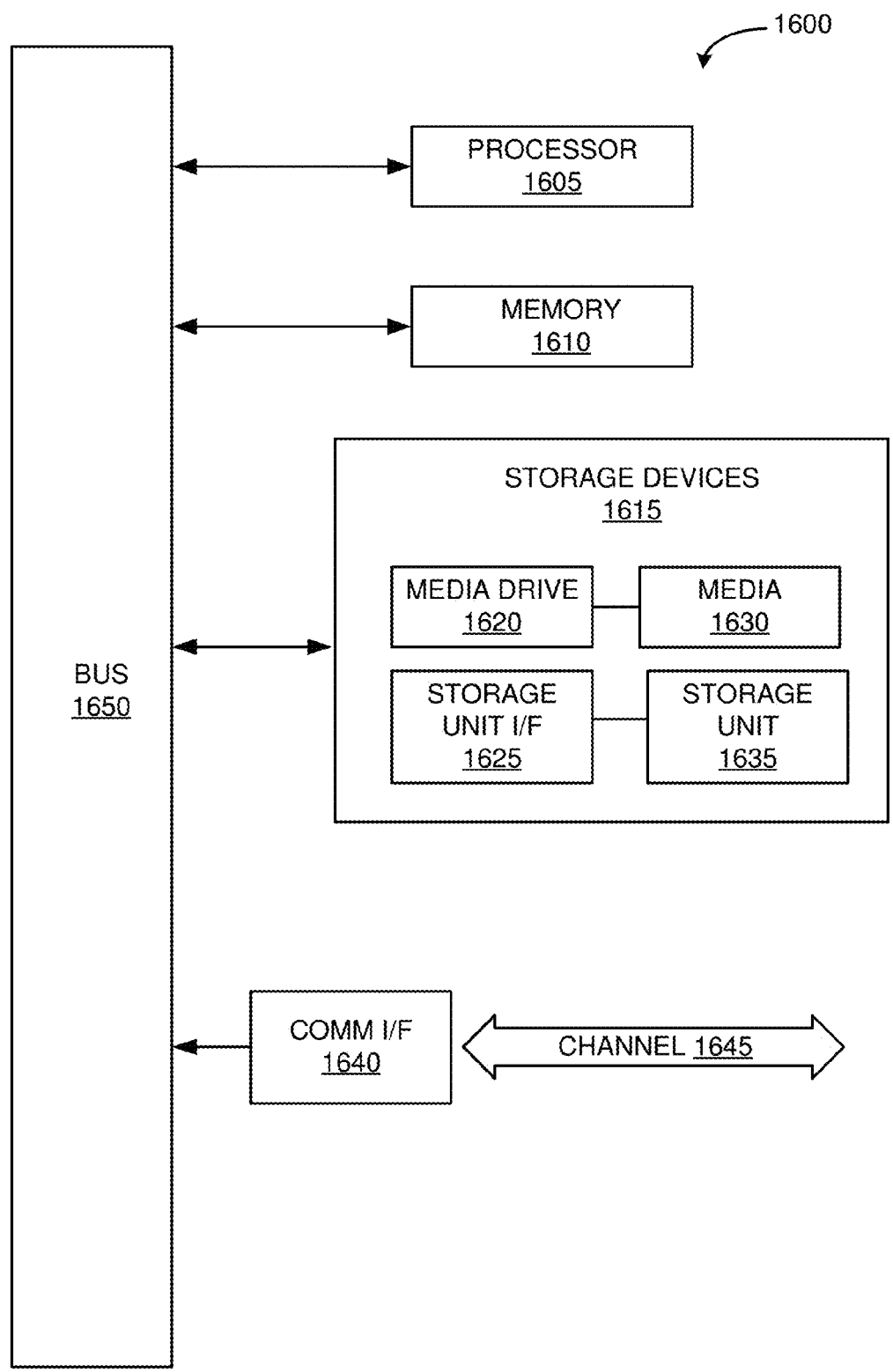
FIG. 16 illustrates an example of a computing module that may be used to implement features of various embodiments of the present disclosure.

Components or modules of various embodiments of the collaborative multimedia composition system for generating, collaborating, and sharing electronic multimedia content can be implemented in whole or in part using software. With reference to FIGS. 1 and 2 described above, the components or modules can be part of the server 110, the database 130, the network 105, 255, Internet 215, and/or the computing devices 225, 230, 235, 237 and 240. Where components or modules of the collaborative multimedia composition system are implemented in whole or in part using software, in one embodiment, these software elements can be implemented to operate with a computing or processing module capable of carrying out the functionality described with respect thereto. One such example computing module is shown in FIG. 16. Various embodiments are described in terms of this example-computing module 1600. After reading this description, it will become apparent to a person skilled in the relevant art how to implement the technology using other computing modules or architectures.

Referring now to FIG. 16, computing module 1600 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1600 might include, for example, one or more processors, controllers, control modules, or other processing devices, such as a processor 1605. Processor 1605 might be implemented using a general-purpose or special-purpose processing engine such as, for example, a microprocessor, controller, or other control logic. In the illustrated example, processor 1605 is connected to a bus 1650, although any communication medium can be used to facilitate interaction with other components of computing module 1600 or to communicate externally.

Computing module 1600 might also include one or more memory modules, simply referred to herein as main memory 1610. For example, preferably random access memory (RAM) or other dynamic memory, might be used for storing information and instructions to be executed by processor 1605. Main memory 1610 might also be used for storing temporary variables or other intermediate information during execution of instructions to be executed by processor 1605. Computing module 1600 might likewise include a read only memory ("ROM") or other static storage device coupled to bus 1650 for storing static information and instructions for processor 1605.

The computing module 1600 might also include one or more various forms of information storage mechanism 1615, which might include, for example, a media drive 1620 and a storage unit interface 1625. The media drive 1620 might include a drive or other mechanism to support fixed or removable storage media 1630. For example, a hard disk drive, a floppy disk drive, a magnetic tape drive, an optical disk drive, a CD or DVD drive (R or RW), or other removable or fixed media drive might be provided. Accordingly, storage media 1630 might include, for example, a hard disk, a floppy disk, magnetic tape, cartridge, optical disk, a CD or DVD, or other fixed or removable medium that is read by, written to or accessed by media drive 1620. As these examples illustrate, the storage media 1630 can include a computer usable storage medium having stored therein computer software or data.

In alternative embodiments, information storage mechanism 1615 might include other similar instrumentalities for allowing computer programs or other instructions or data to be loaded into computing module 1600. Such instrumentalities might include, for example, a fixed or removable storage unit 1635 and an interface 1625. Examples of such storage units 1635 and interfaces 1625 can include a program cartridge and cartridge interface, a removable memory (for example, a flash memory or other removable memory module) and memory slot, a PCMCIA slot and card, and other fixed or removable storage units 1635 and interfaces 1625 that allow software and data to be transferred from the storage unit 1635 to computing module 1600.

Computing module 1600 might also include a communications interface 1640. Communications interface 1640 might be used to allow software and data to be transferred between computing module 1600 and external devices. Examples of communications interface 1640 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1640 might typically be carried on signals, which can be electronic, electromagnetic (which includes optical) or other signals capable of being exchanged by a given communications interface 1640. These signals might be provided to communications interface 1640 via a channel 1645. This channel 1645 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1610, storage unit 1625, media 1630, and channel 1645. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1600 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer system for production of collaborative electronic multimedia compositions by a set of users including an initiating user, a first collaborating user, and a second collaborating user, the system comprising:
   a processor configured to execute instructions;
   electronic storage accessible to the processor, wherein the electronic storage is configured to store a set of electronic collaboration templates that define electronic multimedia compositions;
   a communication interface configured to receive information from a network for delivery to the computer system, and further configured to transmit information from the computer system for delivery to the network;
   a computer-usable medium having instructions embodied thereon, the instructions configured to cause the processor to:
      receive, from the initiating user and through the communication interface, a selection of an electronic collaboration template from the set of electronic collaboration templates, wherein the selected electronic collaboration template defines a collaborative electronic multimedia composition and a set of content fields that are customizable by one or more collaborating users;
      assign a uniform resource locator (URL) to the selected electronic collaboration template, wherein the uniform resource locator (URL) is associated with the collaborative electronic multimedia composition;
      receive, from the initiating user a selection of a set of suggested collaborating users including the first collaborating user and the second collaborating user;
      transmit a first invitation to the first collaborating user, wherein the first invitation includes a way for the first collaborating user to access the uniform resource locator of the selected electronic collaboration template and contribute to the collaborative electronic multimedia composition;
      transmit a second invitation to the second collaborating user, wherein the second invitation includes a way for the second collaborating user to access the uniform resource locator of the selected electronic collaboration template and contribute to the collaborative electronic multimedia composition;
      receive, from the first collaborating user, a first item of electronic content that is designated to customize a first content field of the set of content fields that is defined by the selected electronic collaboration template;
      receive, from the second collaborating user, a second item of electronic content that is designated to customize a second content field of the set of content fields that is defined by the selected electronic collaboration template;
      determine completion of the collaborative electronic multimedia composition; and
      convert the collaborative electronic multimedia composition into a completed multimedia composition that includes the first item and the second item, wherein, responsive to the conversion, the first and second content fields are no longer customizable by the first collaborating user or the second collaborating user.

2. The computer system of claim 1, wherein the completed multimedia composition is an electronic greeting card.

3. The computer system of claim 1, wherein the completed multimedia composition is an electronic album and/or electronic slideshow including one or more photographs, animations, and/or videos.

4. The computer system of claim 1, wherein the first item of electronic content includes one or more of a textual message, a photograph, and a video.

5. The computer system of claim 1, wherein the instructions are further configured to cause the processor to:
   receive, from the initiating user, a selection of a recipient of the completed multimedia composition; and
   transmit a message to the recipient that includes a way for the recipient to access the completed multimedia composition.

6. The computer system of claim 1, wherein the instructions are further configured to cause the processor to:
   download the completed multimedia composition as a local file on a computing device in an executable format.

7. The computer system of claim 1, wherein the instructions are further configured to cause the processor to:
   present an offer to purchase a depiction of the completed multimedia composition on a physical product.

8. The computer system of claim 1, wherein the first item of electronic content is received through the communication interface from a computing device that is associated with the first collaborating user.

9. The computer system of claim 1, wherein completion is determined based on a predetermined time limit that is provided by the initiating user.

10. The computer system of claim 1, wherein completion is determined automatically responsive to receipt of items of electronic content from the set of suggested collaborating users.

11. A method for production of collaborative electronic multimedia compositions by a set of users including an initiating user, a first collaborating user, and a second collaborating user, the method being implemented in a computer system that includes electronic storage and a processor, the method comprising:
  storing a set of electronic collaboration templates that define electronic multimedia compositions;
  receiving, from the initiating user, a selection of an electronic collaboration template from the set of electronic collaboration templates, wherein the selected electronic collaboration template defines a collaborative electronic multimedia composition and a set of content fields that are customizable by one or more collaborating users;
  assigning a uniform resource locator (URL) to the selected electronic collaboration template, wherein the uniform resource locator (URL) is associated with the collaborative electronic multimedia composition;
  receiving, from the initiating user a selection of a set of suggested collaborating users including the first collaborating user and the second collaborating user;
  transmitting a first invitation to the first collaborating user, wherein the first invitation includes a way for the first collaborating user to access the uniform resource locator of the selected electronic collaboration template and contribute to the collaborative electronic multimedia composition;
  transmitting a second invitation to the second collaborating user, wherein the second invitation includes a way for the second collaborating user to access the uniform resource locator of the selected electronic collaboration template and contribute to the collaborative electronic multimedia composition;
  receiving, from the first collaborating user, a first item of electronic content that is designated to customize a first content field of the set of content fields that is defined by the selected electronic collaboration template;
  receiving, from the second collaborating user, a second item of electronic content that is designated to customize a second content field of the set of content fields that is defined by the selected electronic collaboration template;
  determining completion of the collaborative electronic multimedia composition; and
  converting the collaborative electronic multimedia composition into a completed multimedia composition that includes the first item and the second item, wherein, responsive to the conversion, the first and second content fields are no longer customizable by the first collaborating user or the second collaborating user.

12. The method of claim 11, wherein the completed multimedia composition is an electronic greeting card.

13. The method of claim 11, wherein the completed multimedia composition is an electronic album and/or electronic slideshow including one or more photographs, animations, and/or videos.

14. The method of claim 11, wherein the first item of electronic content includes one or more of a textual message, a photograph, and a video.

15. The method of claim 11, further comprising:
  receiving, from the initiating user, a selection of a recipient of the completed multimedia composition; and
  transmitting a message to the recipient that includes a way for the recipient to access the completed multimedia composition.

16. The method of claim 11, further comprising:
  downloading the completed multimedia composition as a local file on a computing device in an executable format.

17. The method of claim 11, further comprising:
  presenting an offer to purchase a depiction of the completed multimedia composition on a physical product.

18. The method of claim 11, wherein completion is determined based on a predetermined time limit that is provided by the initiating user.

19. The method of claim 11, wherein completion is determined automatically responsive to receipt of items of electronic content from the set of suggested collaborating users.

20. A computer system for production of collaborative electronic greeting cards by a set of users including an initiating user, a first collaborating user, and a second collaborating user, the system comprising:
  a processor configured to execute instructions;
  electronic storage accessible to the processor, wherein the electronic storage is configured to store a set of electronic greeting card templates that define electronic greeting cards;
  a communication interface configured to receive information from a network for delivery to the computer system, and further configured to transmit information from the computer system for delivery to the network;
  a computer-usable medium having instructions embodied thereon, the instructions configured to cause the processor to:
    receive, from the initiating user and through the communication interface, a selection of an electronic greeting card template from the set of electronic greeting card templates, wherein the selected electronic greeting card template defines a collaborative electronic greeting card and a set of content fields that are customizable by one or more collaborating users;
    receive, from the initiating user a selection of a set of suggested collaborating users including the first collaborating user and the second collaborating user;
    transmit a first invitation to the first collaborating user, wherein the first invitation includes a way for the first collaborating user to access the selected electronic greeting card template and contribute to the collaborative electronic greeting card;
    transmit a second invitation to the second collaborating user, wherein the second invitation includes a way for the second collaborating user to access the selected electronic greeting card template and contribute to the collaborative electronic greeting card;
    receive, from the first collaborating user, a first item of electronic content that is designated to customize a first content field of the set of content fields that is defined by the selected electronic greeting card template;

receive, from the second collaborating user, a second item of electronic content that is designated to customize a second content field of the set of content fields that is defined by the selected electronic greeting card template; and complete the collaborative electronic greeting card such that the first and second content fields are no longer customizable by the first collaborating user or the second collaborating user.

\* \* \* \* \*